(12) United States Patent
Bhaskara et al.

(10) Patent No.: US 9,831,952 B2
(45) Date of Patent: Nov. 28, 2017

(54) OPTICAL BANDWIDTH MANAGER

(75) Inventors: Vasudha N. Bhaskara, Bangalore (IN);
Lam D. Hoang, San Jose, CA (US);
Kiran Dintakurthi, Fremont, CA (US);
Jagadeesh Virupaksha Huliyar,
Bangalore (IN); Dharmendra Naik,
San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 16 days.

(21) Appl. No.: 13/538,088

(22) Filed: Jun. 29, 2012

(65) Prior Publication Data

US 2014/0003812 A1  Jan. 2, 2014

(51) Int. Cl.
*H04J 14/02* (2006.01)
*H04B 10/27* (2013.01)
*H04L 12/24* (2006.01)

(52) U.S. Cl.
CPC .......... *H04B 10/27* (2013.01); *H04J 14/0227* (2013.01); *H04L 41/0896* (2013.01); *H04J 14/021* (2013.01); *H04J 14/0275* (2013.01)

(58) Field of Classification Search
CPC ...................................................... H04L 41/22
See application file for complete search history.

(56) References Cited

U.S. PATENT DOCUMENTS

| | | | |
|---|---|---|---|
| 7,813,281 B2* | 10/2010 | Bolt et al. | 370/231 |
| 2004/0052525 A1* | 3/2004 | Ovadia | 398/47 |
| 2012/0087665 A1* | 4/2012 | Li et al. | 398/79 |
| 2013/0336658 A1* | 12/2013 | Xia | H04J 14/0204 398/83 |

* cited by examiner

*Primary Examiner* — Nathan Curs
(74) *Attorney, Agent, or Firm* — David L. Soltz

(57) ABSTRACT

A system may receive user input that identifies network entities in an optical network. The system may provide a user interface that displays a representation of the network entities and of optical link types configured to carry optical signals among the network entities. The system may receive user input that identifies a particular optical link type, and may display a representation of optical links, of the particular optical link type, that are associated with the network entities. The system may also display an indication of an allocation status of the optical links. The system may receive user input that identifies an available optical link to be allocated for an optical transmission, and may provide, to the network entities and based on the user input, information that identifies the available optical link to permit the available optical link to be allocated for the optical transmission between the network entities.

9 Claims, 18 Drawing Sheets

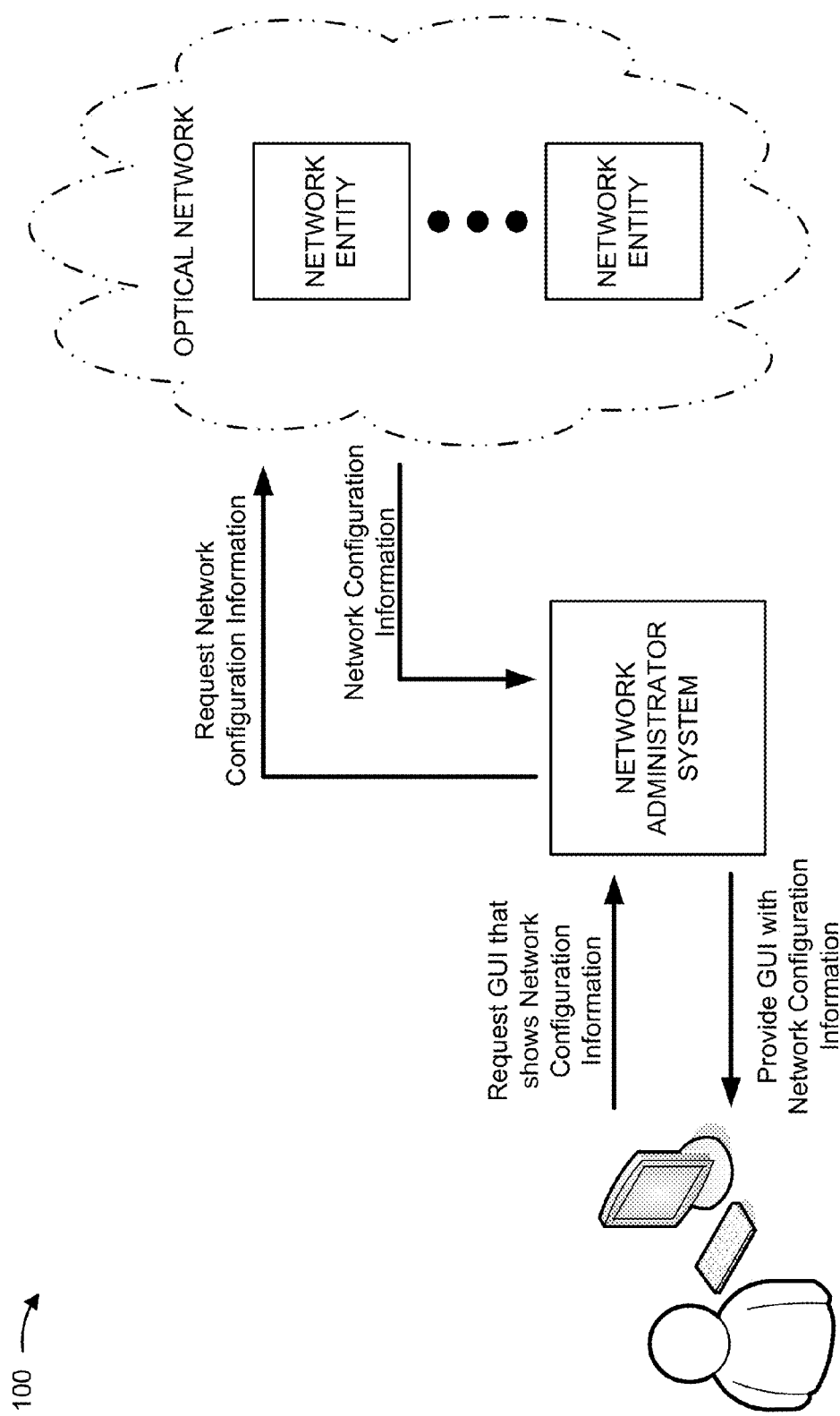

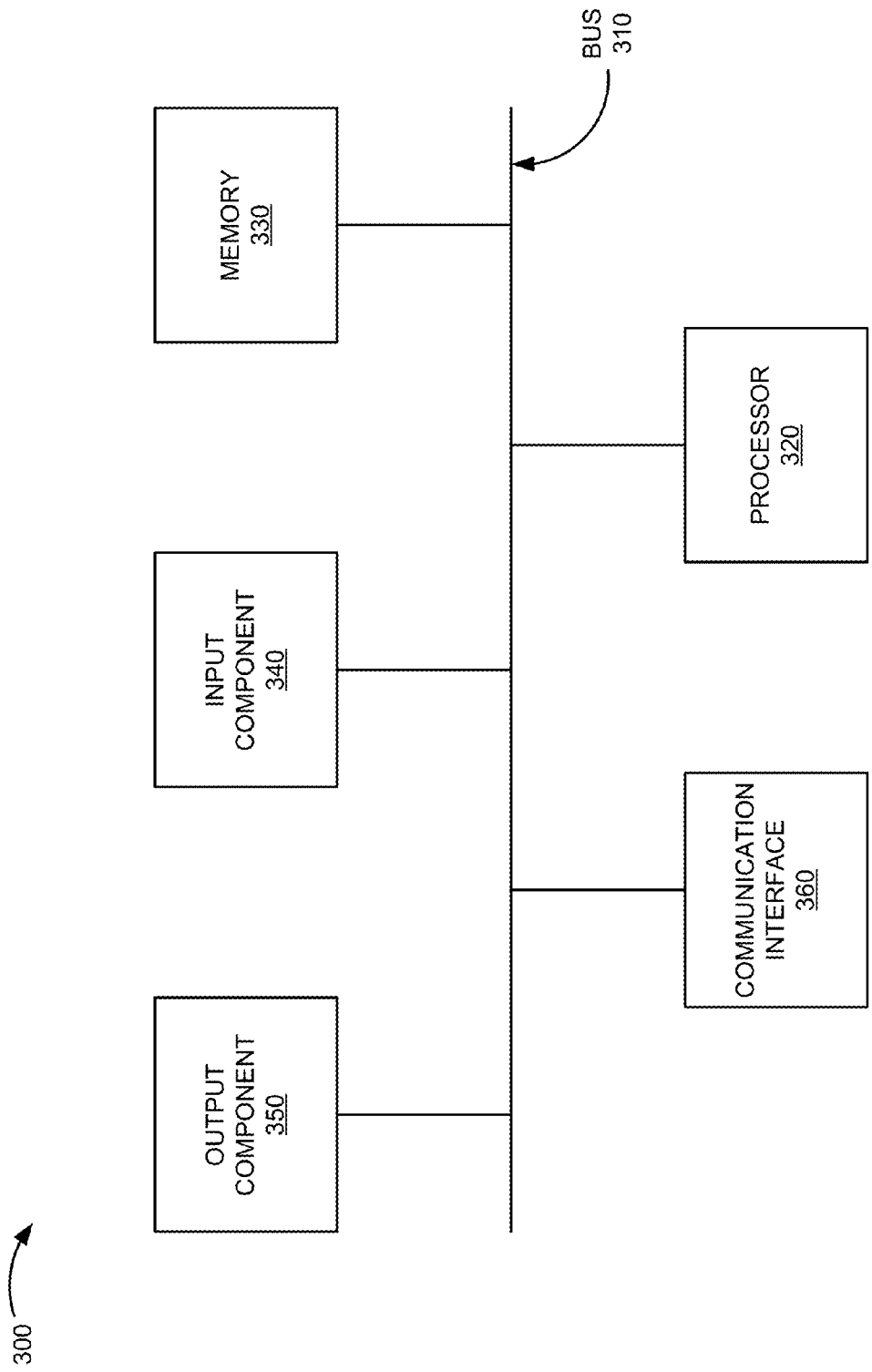

OPTICAL BANDWIDTH MANAGER

BACKGROUND

In optical networks, signals may be transmitted at various wavelengths, with each wavelength corresponding to a transmission channel. Transmission channels may connect network nodes so that signals may be transmitted throughout the optical network. An optical route may use a series of network nodes to connect a source of an optical transmission with a destination for the optical transmission.

SUMMARY

A system may receive first user input that identifies network entities in an optical network. The system may provide, based on the first user input, a user interface that displays a representation of the network entities, and a representation of optical link types that have been configured to carry optical signals among the network entities. The system may receive second user input that identifies a particular optical link type, and may provide, based on the second user input and for display on the user interface, a representation of optical links, of the particular optical link type, that are associated with the network entities. The system may also provide, for display on the user interface, an indication of an allocation status of the optical links. The system may receive, based on the indication of allocation status, third user input that identifies an available optical link, of the plurality of optical links, to be allocated for an optical transmission. The system may provide, based on the third user input and to the network entities, information that identifies the available optical link to permit the available optical link to be allocated for the optical transmission between the network entities.

BRIEF DESCRIPTION OF DRAWINGS

FIGS. 1A-1C are diagrams of an overview of an example implementation described herein;

FIG. 3 is a diagram of example components of one or more devices and/or systems of FIG. 2A and/or FIG. 2B;

DETAILED DESCRIPTION

The following detailed description of example embodiments refers to the accompanying drawings. The same reference numbers in different drawings may identify the same or similar elements.

As used herein, a "route" and/or an "optical route" may correspond to an optical path and/or an optical lightpath. For example, an optical route may specify a path along which light is carried between two or more network entities.

Users of optical networks often need to allocate network capacity (e.g., bandwidth) in order to transmit data. Allocating optical network capacity can be difficult, and may require technicians to directly adjust the hardware associated with network entities (e.g., nodes). Implementations described herein assist a user in remotely allocating network capacity on optical network entities, thus making optical network capacity allocation easier and more efficient.

Figure 1B:
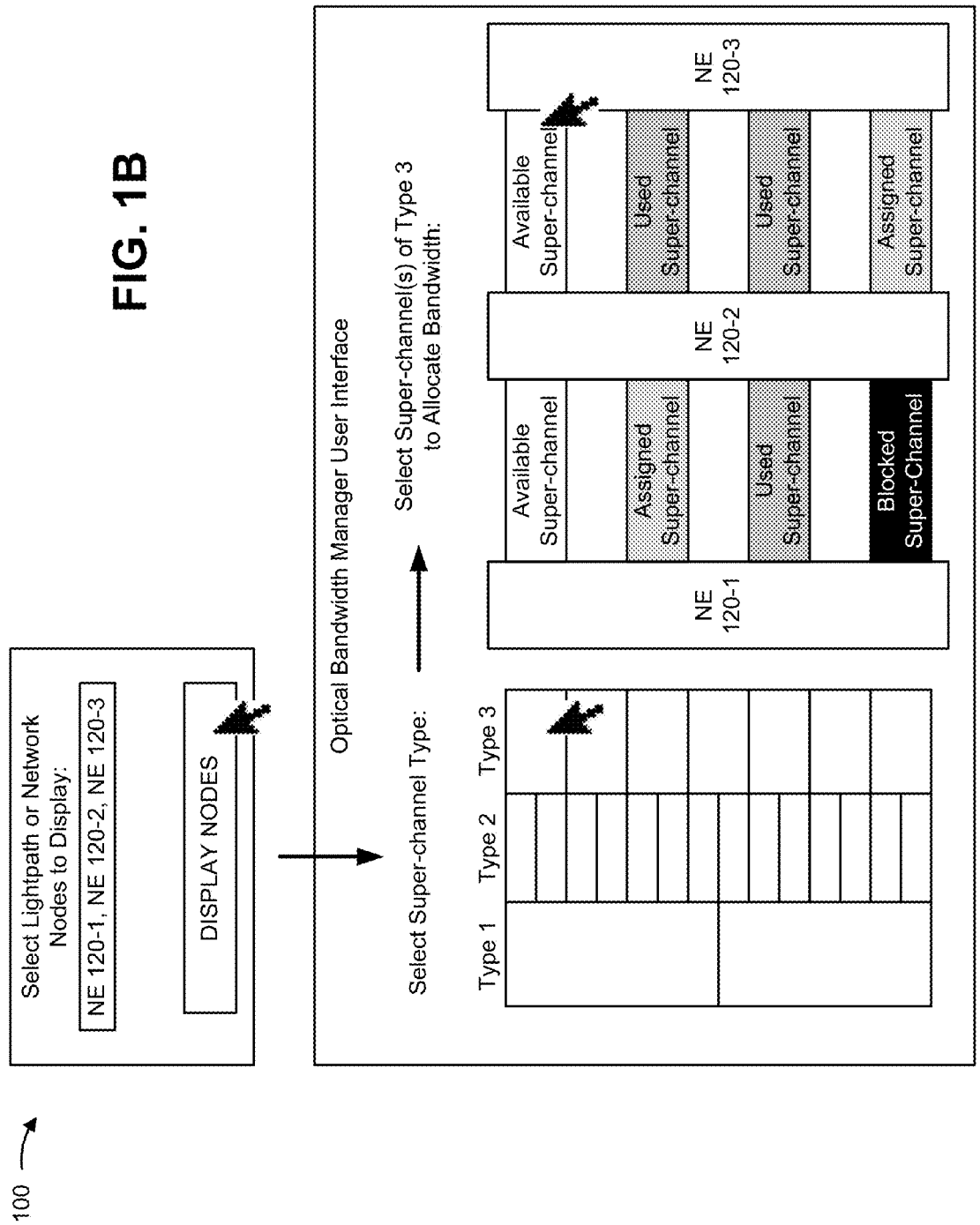
Figure 1C:
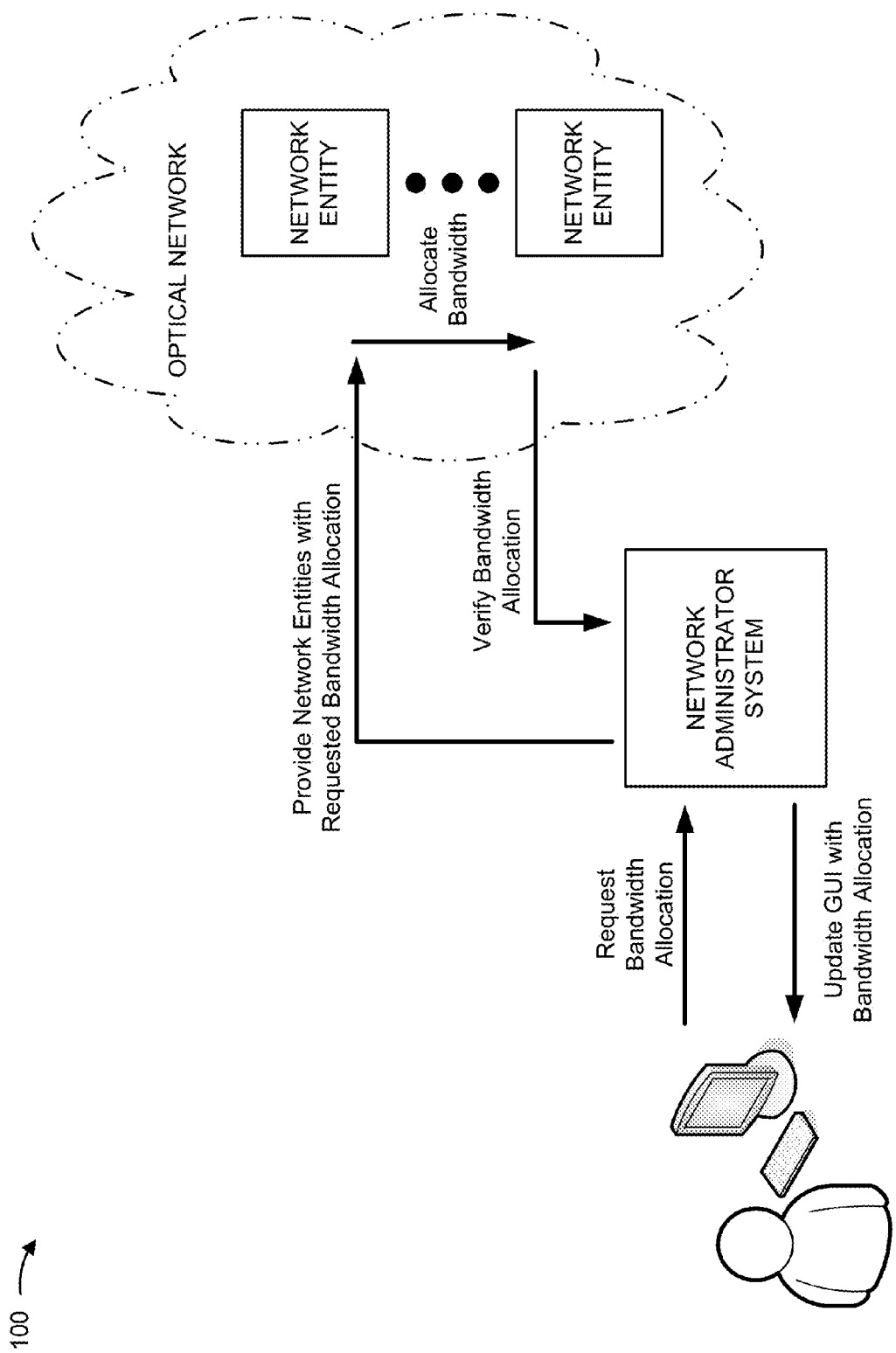

FIGS. 1A through 1C are diagrams of an overview 100 of an implementation described herein. As illustrated in FIG. 1A, a user interacting with a user device may request a graphical user interface ("GUI") that shows network configuration information (e.g., a bandwidth allocation) from a network administrator system. The network administrator system may request the network configuration information from one or more network entities in an optical network. The network administrator system may receive the requested information from the network entities, and may provide the requested GUI to the user device.

As illustrated in FIG. 1B, the user may request the GUI by selecting one or more network nodes and/or or optical routes to display. The user may then select a super-channel type to display on the GUI. For example, the user may select a super-channel type (e.g., super-channel type 3, as illustrated). A super-channel may include multiple channels multiplexed together using wavelength-division multiplexing in order to increase transmission capacity. Various quantities of channels may be combined into super-channels using various modulation formats to create different super-channel types having different characteristics. The GUI may display network configuration information associated with the selected network nodes and the selected super-channel type. For example, the GUI may display an indication of whether a super-channel of the selected type has an allocation status of available, assigned, used, and/or blocked, as illustrated. The user may select an available super-channel in order to allocate bandwidth to the selected super-channel.

As illustrated in FIG. 1C, the requested bandwidth allocation may be received by the network administrator system. The network administrator system may provide the requested bandwidth allocation to network entities associated with the selected super-channel. The network entities may allocate the requested bandwidth, and may provide a verification of the bandwidth allocation to the network administrator system. The network administrator system may update the GUI on the user device to indicate that the requested bandwidth has been allocated.

Figure 2A:
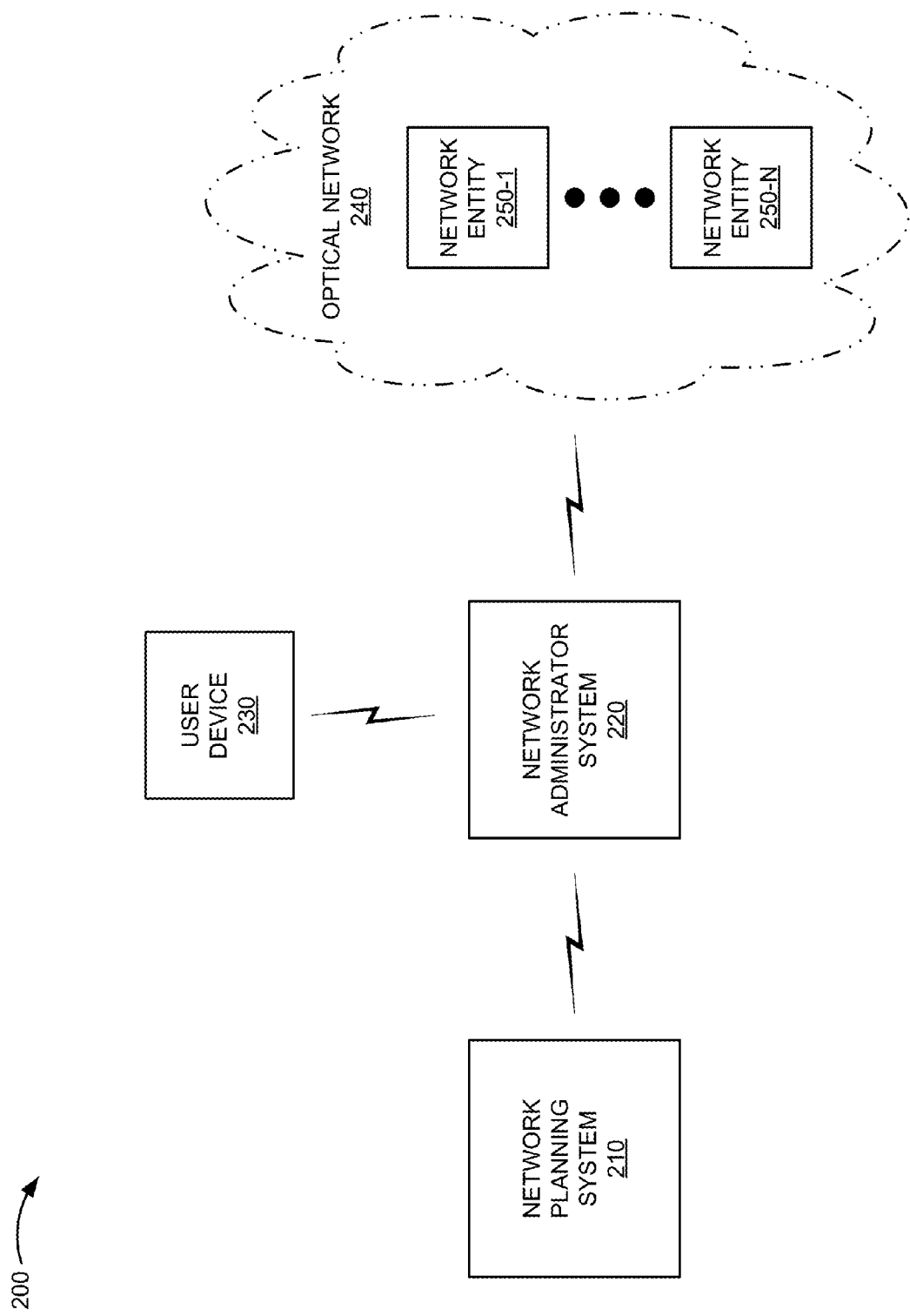
FIG. 2A is a diagram of an example environment in which systems and/or methods described herein may be implemented.

FIG. 2A is a diagram of an example environment 200 in which systems and/or methods described herein may be implemented. Environment 200 may include a network planning system 210 ("NPS 210"), a network administrator system 220 ("NA 220"), a user device 230, and an optical network 240 that includes one or more network entities 250-1 through 250-N (N≥1) (hereinafter referred to individually as "NE 250" and collectively as "NEs 250").

The number of devices and/or networks illustrated in FIG. 2A is provided for explanatory purposes. In practice, there may be additional devices and/or networks, fewer devices and/or networks, different devices and/or networks, or differently arranged devices and/or networks than are shown in FIG. 2A. Furthermore, two or more of the devices illustrated in FIG. 2A may be implemented within a single device, or a single device illustrated in FIG. 2A may be implemented as multiple, distributed devices. Additionally, or alternatively, one or more of the devices of environment 200 may perform one or more functions described as being performed by another one or more of the devices of environment 200. Devices of environment 200 may interconnect via wired connections, wireless connections, or a combination of wired and wireless connections.

NPS 210 may include one or more devices that gather, process, search, store, and/or provide information in a manner described herein. NPS 210 may assist a user in modeling and/or planning an optical network, such as optical network 240. For example, NPS 210 may assist in modeling and/or planning an optical network configuration, which may include a quantity, location, capacity, and/or configuration of NEs 250, characteristics and/or configurations (e.g., capacity) of super-channels between NEs 250, traffic demands of NEs 250 and/or super-channels between NEs 250, and/or any other network configuration information associated with optical network 240 (e.g., optical device configurations, digital device configurations, etc.). NPS 210 may provide information associated with the optical network configuration to NA 220 so that a user may view, change, and/or interact with network configuration information.

NA 220 may include one or more devices that gather, process, search, store, and/or provide information in a manner described herein. NA 220 may receive network configuration information. For example, NA 220 may receive network configuration information from NPS 210, user device 230, optical network 240, and/or NEs 250. NA 220 may provide the network configuration information to another device, such as user device 230, so that a user may interact with the network configuration information. NA 220 may receive information associated with changes to the network configuration from another device (e.g., user device 230), such as a desired bandwidth and/or super-channel allocation between NEs 250. NA 220 may provide information associated with the network configuration changes to optical network 240 and/or NEs 250 in order to allocate network bandwidth and/or super-channels based on the desired allocation. NA 220 may provide information associated with the network configuration changes to another device, such as user device 230, so that a user may interact with the changed network configuration information.

User device 230 may include one or more devices that gather, process, search, store, and/or provide information in a manner described herein. In some implementations, user device 230 may include a computer (e.g., a desktop computer, a laptop computer, a tablet computer, etc.), a radiotelephone, a personal communications system ("PCS") terminal (e.g., that may combine a cellular telephone with data processing and data communications capabilities), a personal digital assistant ("PDA") (e.g., that may include a radiotelephone, a pager, Internet/intranet access, etc.), a smart phone, and/or any other type of computation and/or communication device. User device 230 may provide information to and/or receive information from other devices, such as NA 220. For example, user device 230 may receive network configuration information from NA 220, and may send information associated with network configuration changes to NA 220.

Optical network 240 may include any type of network that uses light as a transmission medium. For example, optical network 240 may include a fiber-optic based network, an optical transport network, a light-emitting diode network, a laser diode network, an infrared network, and/or a combination of these or other types of optical networks.

NEs 250 may include one or more devices that gather, process, store, and/or provide information in a manner described herein. For example, NEs 250 may include one or more optical data processing and/or traffic transfer devices, such as an optical node, an optical add-drop multiplexer ("OADM"), a reconfigurable optical add-drop multiplexer ("ROADM"), an optical multiplexer, an optical demultiplexer, an optical transmitter, and optical receiver, an optical transceiver, a photonic integrated circuit, an integrated optical circuit, a computer, a server, a router, a bridge, a gateway, a modem, a firewall, a switch, a network interface card, a hub, and/or any type of device capable of processing and/or transferring optical traffic. In some implementations, NEs 250 may include OADMs and/or ROADMs capable being configured to add, drop, multiplex, and demultiplex optical signals. NEs 250 may process and transmit optical signals to other NEs 250 throughout optical network 240 in order to deliver optical transmissions.

Figure 2B:
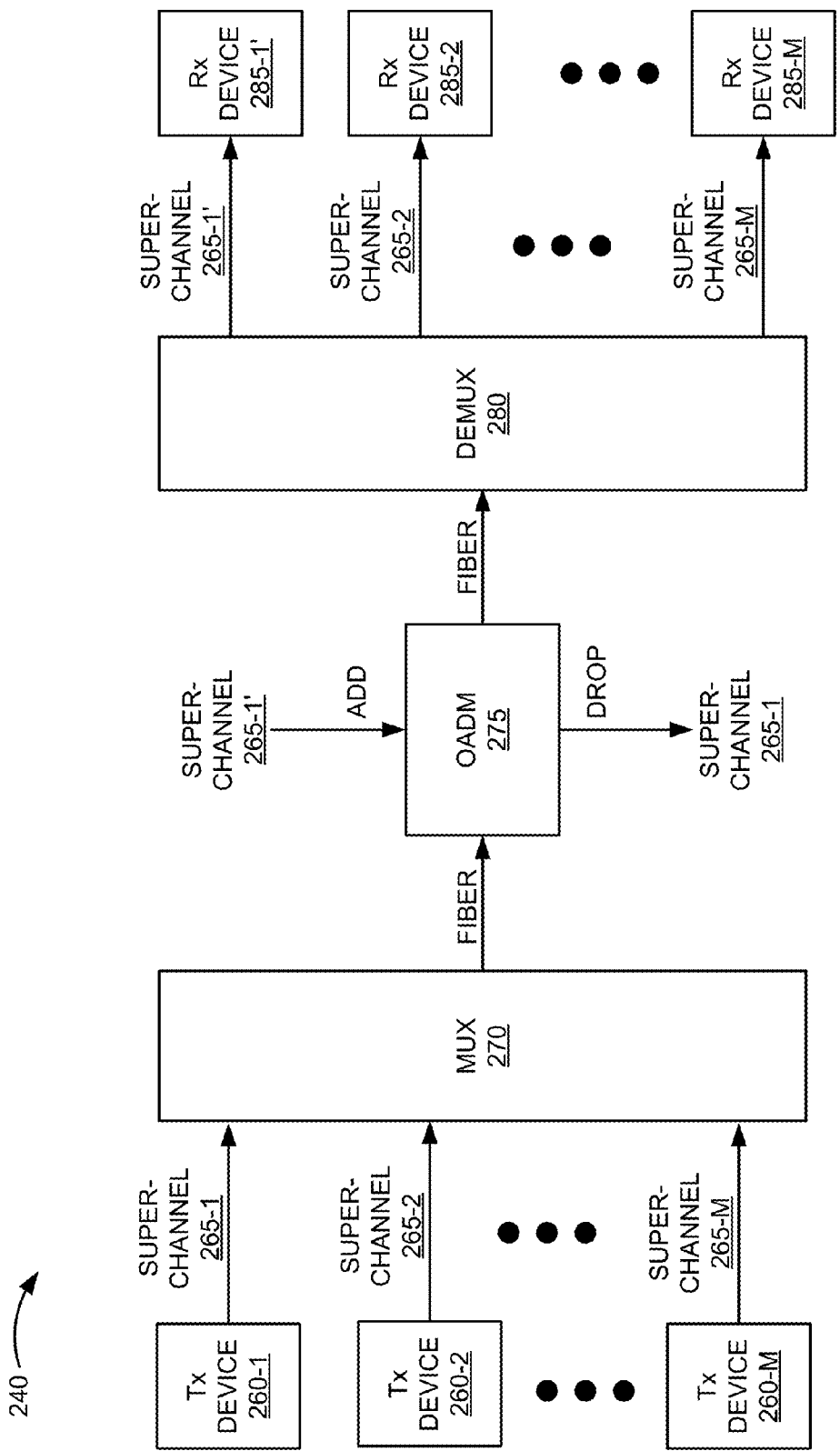
FIG. 2B is a diagram of example devices of an optical network that may be monitored and/or configured according to implementations described herein.

FIG. 2B is a diagram of example devices of optical network 240 that may be monitored and/or configured according to implementations described herein. One or more devices illustrated in FIG. 2B may operate within optical network 240, and may correspond to NEs 250. Optical network 240 may include one or more optical transmitter devices 260-1 through 260-M (M≥1) (hereinafter referred to individually as "Tx device 260" and collectively as "Tx devices 260"), one or more super-channels 265-1 through 265-M (M≥1) (hereinafter referred to individually as "super-channel 265" and collectively as "super-channels 265"), a multiplexer ("MUX") 270, an OADM 275, a demultiplexer ("DEMUX") 280, and one or more optical receiver devices 285-1 through 285-M (M≥1) (hereinafter referred to individually as "Rx device 285" and collectively as "Rx devices 285").

The number of devices illustrated in FIG. 2B is provided for explanatory purposes. In practice, there may be additional devices, fewer devices, different devices, or differently arranged devices than are shown in FIG. 2B. Furthermore, two or more of the devices illustrated in FIG. 2B may be implemented within a single device, or a single device illustrated in FIG. 2B may be implemented as multiple, distributed devices. Additionally, one or more of the devices illustrated in FIG. 2B may perform one or more functions described as being performed by another one or more of the devices illustrated in FIG. 2B. Devices illustrated in FIG. 2B may interconnect via wired connections (e.g., fiber-optic connections).

Tx device 260 may correspond to NE 250. For example, Tx device 260 may include an optical transmitter and/or an optical transceiver that generates an optical signal. One or more optical signals may be carried via super-channel 265. In some implementations, Tx device 260 may be associated with one super-channel 265. Additionally, or alternatively, Tx device 260 may be associated with multiple super-channels 265. Additionally, or alternatively, multiple Tx devices 260 may be associated with one super-channel 265.

Figure 2C:
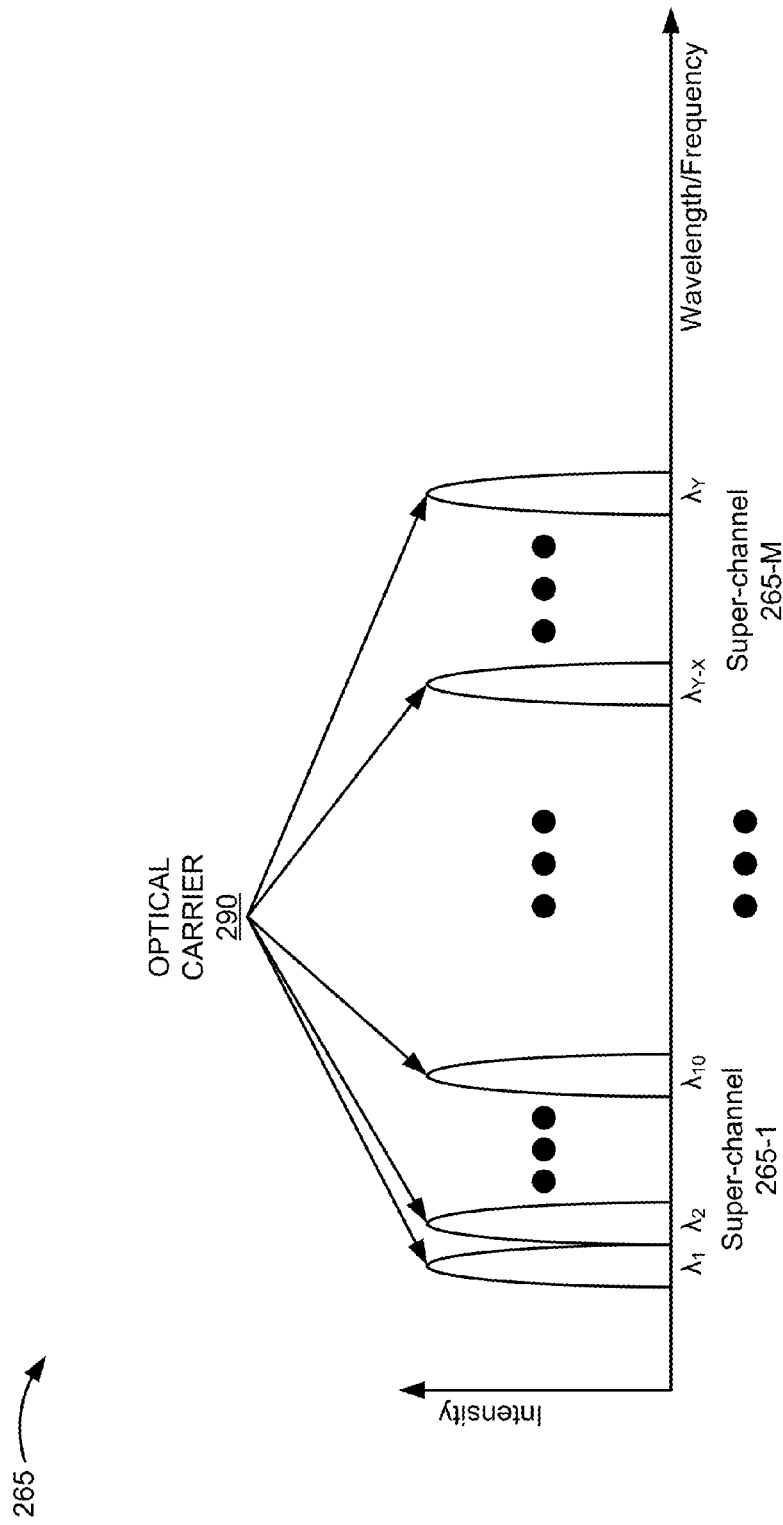
FIG. 2C is a diagram of example super-channels that may be monitored and/or configured according to implementations described herein.

FIG. 2C is a diagram of example super-channels 265 that may be monitored and/or configured according to implementations described herein. A super-channel, as used herein, may refer to multiple optical carriers that are simultaneously transported over the same optical waveguide (e.g., a single mode optical fiber). Each optical carrier included in a super-channel may be associated with a particular optical wavelength (or set of optical wavelengths). The multiple optical carriers may be combined to create a super-channel using wavelength division multiplexing. For example, the multiple optical carriers may be combined using dense wavelength division multiplexing, in which carrier-to-carrier spacing may be less than 1 nanometer. In some implementations, each optical carrier may be modulated to carry an optical signal.

An example frequency and/or wavelength spectrum associated with super-channels 265 is illustrated in FIG. 2C. In some implementations, the frequency and/or wavelength spectrum may be associated with a particular optical spectrum (e.g., C Band, C+ Band, CDC Band, etc.). As illustrated, super-channel 265-1 may include multiple optical carriers 290, each of which corresponds to a wavelength $\lambda$ (e.g., $\lambda_1$, $\lambda_2$, through $\lambda_{10}$) within a first wavelength band. Similarly, super-channel 265-M may include multiple optical carriers 290, each of which corresponds to a wavelength $\lambda$ (e.g., $\lambda_{Y-X}$ through $\lambda_Y$) within a second wavelength band. The quantity of illustrated optical carriers 290 per super-channel 265 is provided for explanatory purposes. In practice, super-channel 265 may include any quantity of optical carriers 290.

Optical carrier 290 may be associated with a particular frequency and/or wavelength of light. In some implementations, optical carrier 290 may be associated with a frequency and/or wavelength at which the intensity of light carried by optical carrier 290 is strongest (e.g., a peak intensity, illustrated by the peaks on each optical carrier 290). In some implementations, optical carrier 290 may be associated with a set of frequencies and/or a set of wavelengths centered at a central frequency and/or wavelength. The intensity of light at the frequencies and/or wavelengths around the central frequency and/or wavelength may be weaker than the intensity of light at the central frequency and/or wavelength, as illustrated.

In some implementations, the spacing between adjacent wavelengths (e.g., $\lambda_1$ and $\lambda_2$) may be equal to or substantially equal to a bandwidth (or bit rate) associated with a data stream carried by optical carrier 290. For example, assume each optical carrier 290 included in super-channel 265-1 (e.g., $\lambda_1$ through $\lambda_{10}$) is associated with a 50 Gigabit per second ("Gbps") data stream. In this example, super-channel 265-1 may have a collective data rate of 500 Gbps (e.g., 50 Gbps×10). In some implementations, the collective data rate of super-channel 265 may be greater than or equal to 100 Gbps. Additionally, or alternatively, the spacing between adjacent wavelengths may be non-uniform, and may vary within a particular super-channel band (e.g., super-channel 265-1). In some implementations, optical carriers 290 included in super-channel 265 may be non-adjacent (e.g., may be associated with non-adjacent wavelengths in an optical spectrum).

Returning to FIG. 2B, each super-channel 265 may be provisioned in optical network 240 as one optical channel and/or as an individual optical channel. Provisioning of an optical channel may include designating a route and/or path for the optical channel through optical network 240. For example, an optical channel may be provisioned to be transmitted via a set of NEs 250. In some implementations, NEs 250 may be configured as a ring. Additionally, or alternatively, NEs 250 may be configured in a point-to-point configuration. Provisioning may be referred to as "allocating" and/or "allocation" herein. Even though each super-channel 265 is a composite of multiple optical carriers 290, the optical carriers 290 included in super-channel 265 may be routed together through optical network 240. Additionally, or alternatively, super-channel 265 may be managed and/or controlled in optical network 240 as though it included one optical channel and/or one optical carrier at one wavelength.

MUX 270 may correspond to NE 250. For example, MUX 270 may include an optical multiplexer that combines multiple input super-channels 265 for transmission over an output fiber.

OADM 275 may correspond to NE 250. For example, OADM 275 may include a remotely reconfigurable optical add-drop multiplexer. OADM 275 may multiplex, de-multiplex, add, drop, and/or route multiple super-channels 265 into and/or out of a fiber (e.g., a single mode fiber). As illustrated, OADM 275 may drop super-channel 265-1 from a fiber, and may allow super-channels 265-2 through 265-M to continue propagating toward Rx device 285. Dropped super-channel 265-1 may be provided to a device (not shown) that may demodulate and/or otherwise process super-channel 265-1 to output the data stream carried by super-channel 265-1. As illustrated, super-channel 265-1 may be provisioned for transmission from Tx device 260-1 to OADM 275, where super-channel 265-1 may be dropped.

As further illustrated in FIG. 2B, OADM 275 may add super-channel 265-1' (e.g., $265\text{-}1^{prime}$) to the fiber. Super-channel 265-1' may include optical carriers 290 at the same or substantially the same wavelengths as super-channel 265-1. Super-channel 265-1' and super-channels 265-2 through 265-M may propagate to DEMUX 280.

DEMUX 280 may correspond to NE 250. For example, DEMUX 280 may include an optical de-multiplexer that separates multiple super-channels 265 carried over an input fiber. For example, DEMUX 280 may separate super-channels 265-1' and super-channels 265-2 through 265-M, and may provide each super-channel 265 to a corresponding Rx device 285.

Rx device 285 may correspond to NE 250. For example, Rx device 285 may include an optical receiver and/or an optical transceiver that receives an optical signal. One or more optical signals may be received at Rx device 285 via super-channel 265. Rx device 285 may convert a super-channel 265 into one or more electrical signals, which may be processed to output the information associated with each data stream carried by optical carriers 290 included in super-channel 265. In some implementations, Rx device 285 may be associated with one super-channel 265. Additionally, or alternatively, Rx device 285 may be associated with multiple super-channels 265. Additionally, or alternatively, multiple Rx devices 285 may be associated with one super-channel 265.

FIG. 3 is a diagram of example components of a device 300. Device 300 may correspond to NPS 210, NA 220, user device 230, and/or NE 250. Additionally, or alternatively, each of NPS 210, NA 220, user device 230, and/or NEs 250 may include one or more devices 300 and/or one or more components of device 300.

Device 300 may include a bus 310, a processor 320, a memory 330, an input component 340, an output component 350, and a communication interface 360. In some implementations, device 300 may include additional components, fewer components, different components, or differently arranged components than those illustrated in FIG. 3.

Bus 310 may include a path that permits communication among the components of device 300. Processor 320 may include a processor, a microprocessor, and/or any processing logic (e.g., a field-programmable gate array ("FPGA"), an application-specific integrated circuit ("ASIC"), etc.) that may interpret and execute instructions. Memory 330 may include a random access memory ("RAM"), a read only memory ("ROM"), and/or any type of dynamic or static storage device (e.g., a flash, magnetic, or optical memory) that may store information and/or instructions for use by processor 320.

Input component 340 may include any mechanism that permits a user to input information to device 300 (e.g., a keyboard, a keypad, a mouse, a button, a switch, etc.). Output component 350 may include any mechanism that outputs information (e.g., a display, a speaker, one or more light-emitting diodes ("LEDs"), etc.). Communication interface 360 may include any transceiver-like mechanism, such as a transceiver and/or a separate receiver and transmitter, that enables device 300 to communicate with other devices and/or systems, such as via a wired connection, a wireless connection, or a combination of wired and wireless connections. For example, communication interface 360 may include mechanisms for communicating with another device and/or system via a network, such as optical network 240. Additionally, or alternatively, communication interface 360 may be a logical component that includes input and output ports, input and output systems, and/or other input and output components that facilitate the transmission of data to and/or from other devices, such as an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions contained in a computer-readable medium, such as memory 330. A computer-readable medium may be defined as a non-transitory memory device. A memory device may include space within a single storage device or space spread across multiple storage devices.

Software instructions may be read into memory 330 from another computer-readable medium or from another device via communication interface 360. Software instructions stored in memory 330 may cause processor 320 to perform processes that are described herein. Additionally, or alternatively, hardwired circuitry may be used in place of or in combination with software instructions to implement processes described herein. Thus, implementations described herein are not limited to any specific combination of hardware circuitry and software.

Figure 4:
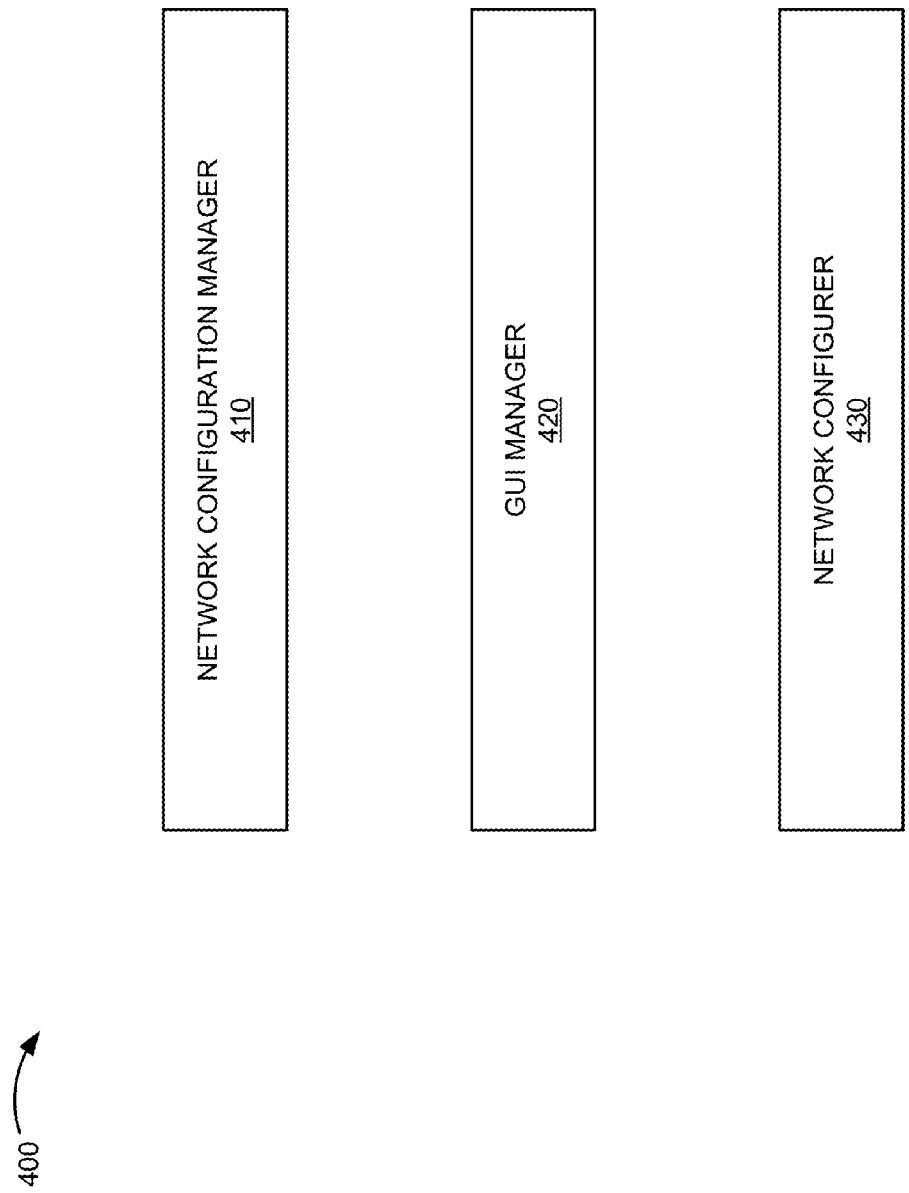
FIG. 4 is a diagram of example functional components of one or more devices of FIG. 2A and/or FIG. 2B.

FIG. 4 is a diagram of example functional components of a device 400 that may correspond to NA 220 and/or user device 230. As illustrated, device 400 may include a network configuration manager 410, a graphical user interface ("GUI") manager 420, and a network configurer 430. Each of functional components 410-430 may be implemented using one or more components of device 300. NA 220 and/or user device 230 may individually include all of the functional components illustrated in FIG. 4, or the functional components illustrated in FIG. 4 may be distributed singularly or duplicatively in any manner between the devices illustrated in FIG. 2A and/or FIG. 2B. In some implementations, NA 220 and/or user device 230 may include other functional components (not shown) that aid in managing optical network configurations and allocating optical network resources.

Network configuration manager 410 ("NCM 410") may perform operations associated with managing a network configuration. In some implementations, NCM 410 may receive network configuration information from NPS 210 and/or NEs 250.

Network configuration information received from NPS 210 may include a quantity, location, capacity, and/or configuration of NEs 250; characteristics and/or configurations (e.g., capacity) of super-channels between NEs 250; traffic demands of NEs 250 and/or super-channels between NEs 250, and/or any other network configuration information associated with optical network 240 (e.g., optical device configurations, digital device configurations, etc.). In some implementations, a user may model and/or plan a configuration of an optical network 240 using NPS 210. NCM 410 may receive the network configuration data modeled and/or planned using NPS 210, thus providing initial network configuration information to NCM 410.

The initial network configuration information provided to NCM 410 may be supplemented with network configuration information received from NEs 250. For example, NEs 250 may provide real-time network deployment information to update the initial network configuration information provided by NPS 210. For example, NCM 410 may receive network configuration information from NEs 250 that identifies newly-deployed NEs 250 and/or new super-channels between NEs 250. Additionally, or alternatively, NCM 410 may receive other network configuration information from NEs 250, such as super-channel allocation information that identifies super-channels that are available for optical transmission, assigned to transmit optical signals, currently being used to transmit optical signals, and/or blocked from transmitting optical signals.

NCM 410 may transmit the network configuration information received from NPS 210 and/or NEs 250 to GUI manager 420 so that a GUI providing network configuration information may be updated (e.g., on NA 220 and/or user device 230).

GUI manager 420 may perform operations associated with managing a graphical user interface that provides network configuration information and aids in changing a network configuration. GUI manager 420 may receive network configuration information from NCM 410, and may provide the network configuration information for display on a device (e.g., NA 220 and/or user device 230). Additionally, or alternatively, GUI manager 420 may receive information associated with changes to a network configuration, such as an allocation of super-channels between NEs 250, from a user interacting with a GUI (e.g., via NA 220 and/or user device 230). GUI manager 420 may provide the information associated with the network configuration changes to network configurer 430 so that optical network 240 and/or NEs 250 may be configured in accordance with the changes.

Network configurer 430 may perform operations associated with configuring an optical network and/or network entities associated with an optical network. For example, network configurer 430 may aid in configuring optical network 240 and/or NEs 250. Network configurer 430 may receive information associated with network configuration changes from GUI manager 420. Network configurer 430 may communicate the information associated with the changes to NEs 250 (and/or other devices in optical network 240) so that NEs 250 may adjust their configuration in accordance with the network configuration changes. For example, network configurer 430 may provide instructions to NEs 250 that indicate that NEs 250 are to reserve capacity (e.g., bandwidth) over one or more super-channels connecting NEs 250. In some implementations, network configurer 430 may receive information validating a changed configuration from NEs 250, and may provide the configuration validation information to GUI manager 420 so that the validated changes may be displayed on a GUI (e.g., on NA 220 and/or user device 230).

Figure 5:
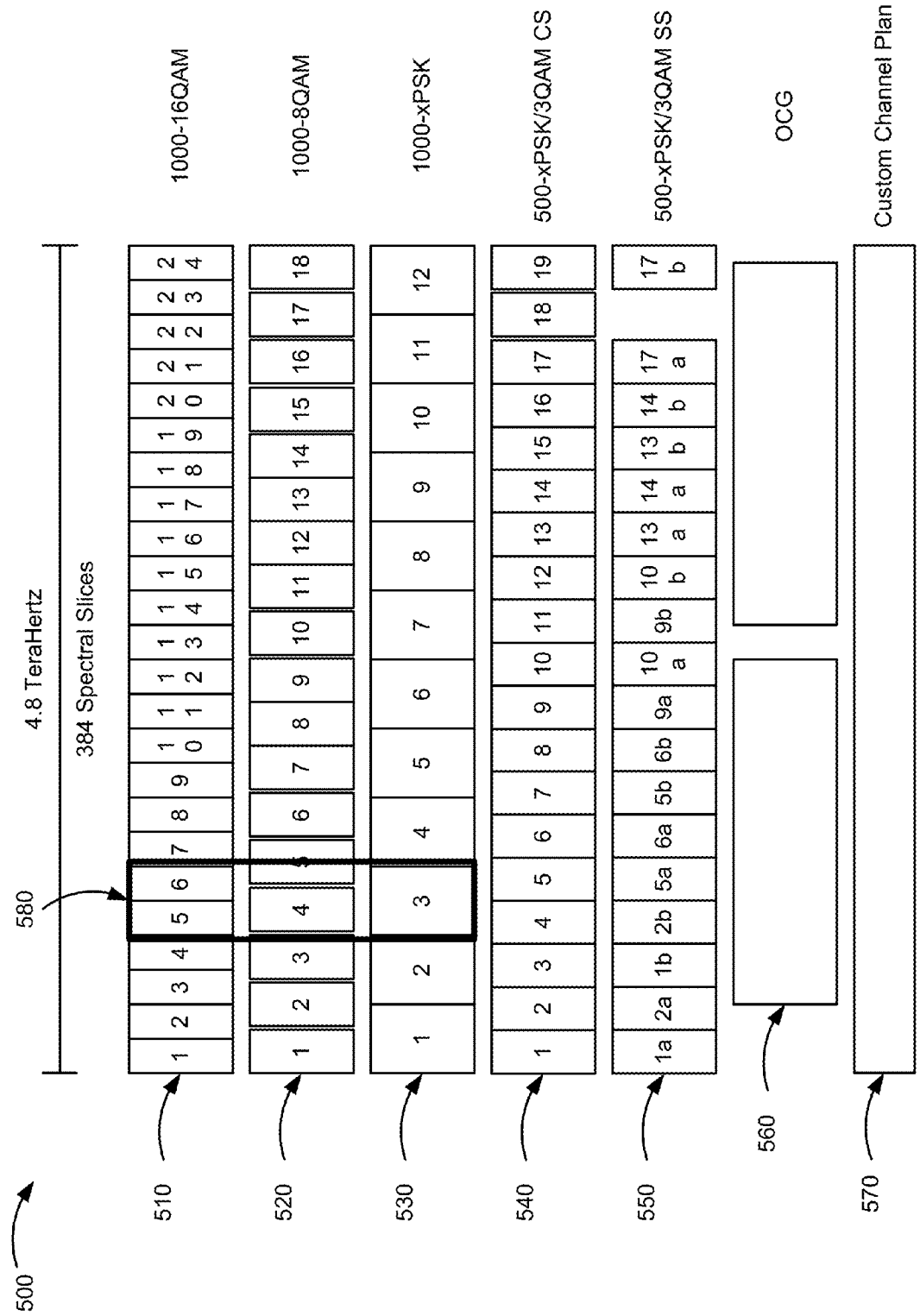
FIG. 5 is a diagram of example super-channels types that may be used to allocate optical network capacity.

FIG. 5 is a diagram of example super-channel types 500 that may be used to allocate optical network capacity. A super-channel represents a high capacity channel containing multiple optical carriers that are co-routed through an optical network as a single entity. Super-channel types may have different characteristics depending on how many optical carriers are multiplexed together to form a super-channel, a type of modulation format used to aggregate the carriers, an amount of bandwidth allocated to the super-channel, how the super-channel is allocated over the spectrum (e.g., contiguous spectrum allocation over contiguous spectral slices, split spectrum allocation over non-contiguous spectral slices, etc.), and/or other characteristics that may be used to differentiate super-channels.

Modulation formats used to multiplex optical carriers into super-channels may include binary phase-shift keying ("BPSK"), differential phase-shift keying ("DPSK"), quadrature phase-shift keying ("QPSK"), quadrature amplitude modulation ("QAM"), 3QAM, 8QAM, 16QAM, etc. The abbreviation "xPSK" may be used herein to refer to any type of phase-shift keying modulation format.

A spectral slice (a "slice") may represent a spectrum of a particular size in a frequency band (e.g., 12.5 gigahertz ("GHz"), 6.25 GHz, etc.). For example, FIG. 5 shows a 4.8 terahertz ("THz") frequency band consisting of 384 spectral slices. In this example, each spectral slice represents 12.5 GHz of the 4.8 THz spectrum. A super-channel may include a different quantity of spectral slices depending on the super-channel type. For example, super-channel type 510 includes 16 spectral slices per super-channel, for a total of 24 super-channels in the 4.8 THz/384 spectral slice frequency band (16×24=384).

Super-channel type 510 may represent a super-channel with a bandwidth of 1000 Gbps (e.g., 1 Terabit per second, "Tbps") modulated using 16QAM (identified as "1000-16QAM"). Super-channel type 520 may represent a super-channel with a bandwidth of 1000 Gbps (1 Tbps) modulated using 8QAM (identified as "1000-8QAM"). Super-channel type 530 may represent a super-channel with a bandwidth of 1000 Gbps (1 Tbps) modulated using PSK (e.g., QPSK, BPSK, DPSK, represented generally by "xPSK") (identified as "1000-xPSK"). In some implementations, super-channel types 510-530 may represent super-channels with bandwidths other than 1000 Gbps. Super-channels may be identified by the bandwidth and modulation type associated with the super-channel. For example, a super-channel with a bandwidth of 1000 Gbps that uses 16QAM modulation may be identified as "1000-16QAM."

As illustrated by box 580, super-channel types may include a different quantity of spectral slices per super-channel. For example, two super-channels of type 510 may include the same number of spectral slices as one super-channel of type 530. Super-channel type 510 may include 16 contiguous spectral slices per super-channel. Super-channel type 520 may include 21 contiguous spectral slices per super-channel. Super-channel type 530 may include 32 contiguous spectral slices per super-channel.

Super-channel type 540 may represent a super-channel with a bandwidth of 500 Gbps allocated over contiguous spectral slices (e.g., contiguous spectrum, or "CS"), and modulated using, for example, either PSK (identified as "500-xPSK CS") or 3QAM (identified as "500-3QAM CS") (collectively identified as "500-xPSK/3QAM CS"). Super-channel type 540 may include 20 contiguous spectral slices per super-channel. Contiguous spectrum may identify super-channels where every spectral slice included in the super-channel is contiguous (e.g., super-channel 1 of super-channel type 540 includes spectral slices 1-20). In some implementations, super-channel type 540 may represent super-channels with bandwidths other than 500 Gbps (e.g., 250 Gbps, 375 Gbps, etc.).

Super-channel type 550 may represent a super-channel with a bandwidth of 500 Gbps allocated over non-contiguous spectral slices routed together (e.g., split spectrum, or "SS"), and modulated using, for example, either PSK (identified as "500-xPSK SS") or 3QAM (identified as "500-3QAM SS") (collectively identified as "500-xPSK/3QAM SS"). Super-channel type 550 may include 40 non-contiguous (e.g., split spectrum) spectral slices per super-channel. Split spectrum may identify super-channels including spectral slices that are not contiguous, but are routed together (e.g., super-channel 1 of super-channel type 550, illustrated in the figure as "1a" and "1b," includes spectral slices 1-20 and 41-60).

Super-channel type 560 may represent Optical Carrier Groups ("OCG"). OCG super-channels may be allocated over non-contiguous sets of slices (e.g., ten non-contiguous sets of two adjacent spectral slices). Super-channel type 560 may represent 16 OCG super-channels.

Super-channel type 570 may represent transmissions over a route and/or lightpath defined by a custom channel plan. A custom channel plan may allow transmission over any set of spectral slices (e.g., a user-specified set of spectral slices).

Figure 6:
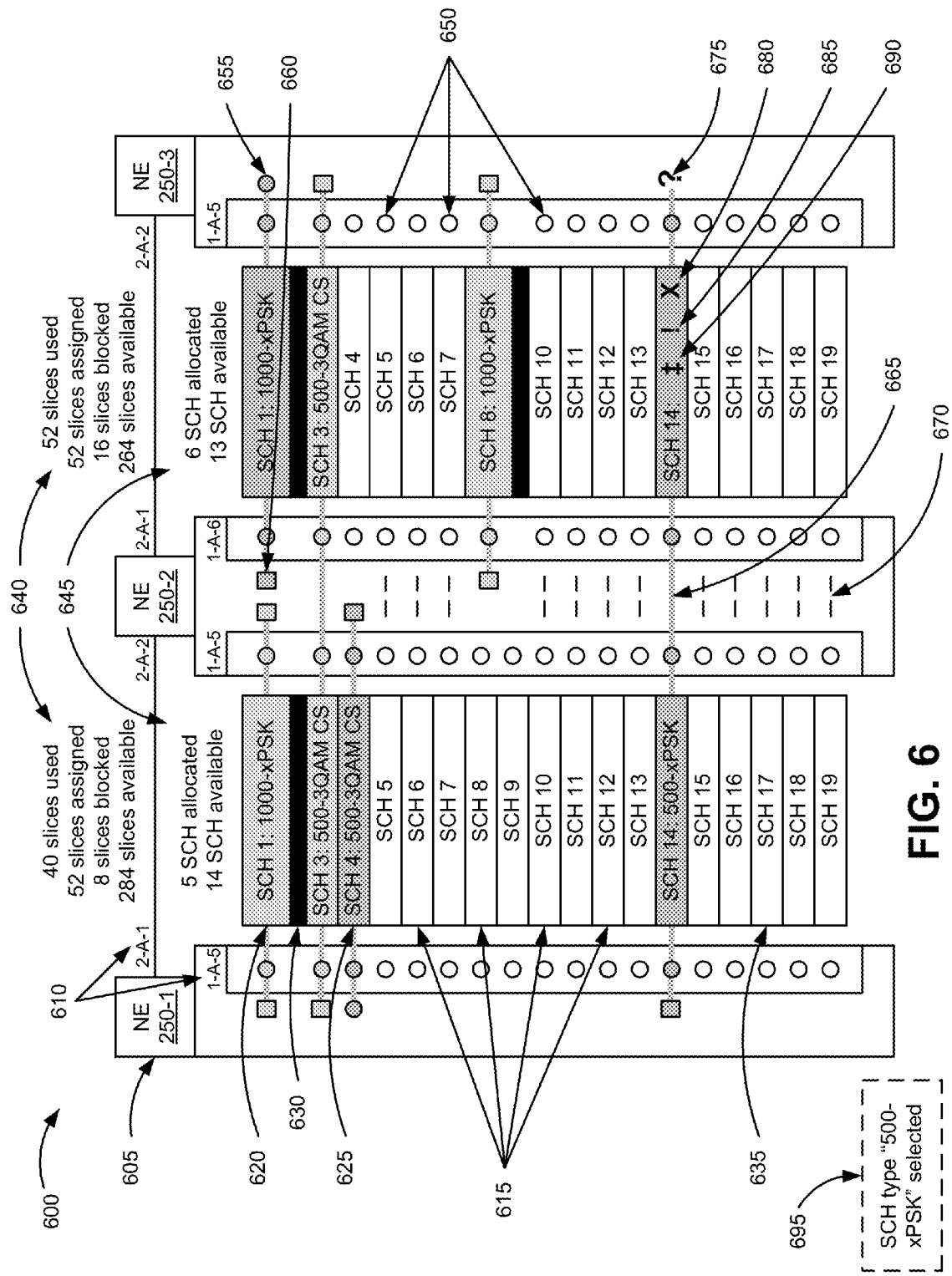
FIG. 6 is a diagram of an example user interface for providing optical network configuration data.

FIG. 6 is a diagram of an example user interface 600 ("UI 600") for providing network configuration information. In some implementations, UI 600 may be displayed by NA 220 and/or user device 230. As illustrated, UI 600 may include a node display element 605, a component display element 610, super-channel display elements 615-635, allocation display elements 640 and 645, a termination point display element 650, an add/drop display element 655, an express route display element 660, local route identifier elements 665 and 670, alert elements 675-690, and selected super-channel type identifier element 695. Additionally, or alternatively, UI 600 may include fewer elements, additional elements, different elements, or differently arranged elements than those illustrated in FIG. 6.

UI 600 may provide information associated with NEs 250 and/or super-channels between NEs 250. In some implementations, UI 600 may provide information received from NCM 410, GUI manager 420, and/or network configurer 430. UI 600 may be updated in real-time and/or periodically to provide current network configuration information. Additionally, or alternatively, UI 600 may receive inputs (e.g., super-channel allocations) from a user for transmission via GUI manager 420 to network configurer 430 and/or NEs 250.

UI 600 may provide a mechanism (e.g., a button, an icon, a link, a text box, etc.) for a user to specify NEs 250 to display on UI 600. UI 600 may display all of the user-specified NEs 250 or a portion of the user-specified NEs. The portion of the user-specified NEs 250 that are displayed may include a source NE 250 where a transmission is initiated and/or a destination NE 250 where a transmission terminates. UI 600 may display user-specified NEs 250 based on user selection of particular NEs 250, user selection of a route associated with particular NEs 250, user selection of one or more super-channels associated with particular NEs 250, user selection of one or more components associated with particular NEs 250, and/or user selection of other information associated with particular NEs 250.

Node display element 605 may provide information associated with network nodes, such as NEs 250. For example, node display element 605 may display a representation of NEs 250 associated with a particular optical route (e.g., a user-specified optical lightpath connecting multiple NEs 250), an identification of the displayed NEs 250 (e.g., NEs 250-1, 250-2, and 250-3, as illustrated), a representation of components of the displayed NEs 250, and/or other information associated with NEs 250. Node display element 605 may display particular NEs 250 in optical network 240 based on a user selection of NEs 250, a user selection of an optical route associated with NEs 250, a user selection of a fiber associated with NEs 250, and/or a user selection of other information associated with NEs 250.

Component display element 610 may provide information associated with components of displayed NEs 250. For example, component display element 610 may display a representation of one or more components connected to a transmission fiber that connects the displayed NEs 250 (e.g., an inline amplifier module ("IAM"), an inline Raman module, a flex ROADM module ("FRM"), a field replaceable unit, etc.). Additionally, or alternatively, component display element 610 may display an identification of the component (e.g., IAMs "2-A-1" and "2-A-2," FRMS "1-A-5" and "1-A-6," as illustrated).

Super-channel display elements ("SDE" or "SDEs") 615-635 may provide a representation of one or more super-channels that may transmit data between displayed NEs 250. SDE 615 may display a quantity of super-channels between displayed NEs 250 based on a user selection of a super-channel type and a quantity of spectral slices included in the selected super-channel type. For example, super-channel type "500-xPSK" includes 20 spectral slices per super-channel, which allows for 19 super-channels in a frequency band occupying 384 slices. If a user selects super-channel type "500-xPSK," SDE 615 may display 19 super-channels (labeled "SCH" in the figures), as illustrated.

SDE 615 may display a super-channel in a particular manner depending on characteristics of the super-channel, such as a quantity of spectral slices associated with the super-channel (e.g., 20 slices, 32 slices, etc.), a relative position of the associated spectral slices within an optical spectrum (e.g., slices 1-20 may occupy a different wavelength and/or position than slices 21-54), a super-channel type associated with the super-channel (e.g., "500-xPSK"), an allocation status associated with the super-channel (e.g., assigned, used, blocked, and/or available), an alert status associated with the super-channel (e.g., in service, out of service, misconfigured, not optically viable, and/or other alerts), and/or other information associated with a displayed super-channel.

SDE 615 may display a super-channel in a particular and/or relative position (e.g., a position on a display) to convey information associated with the super-channel. For example, SDE 615 may display super-channels in a particular position based on the spectral slices associated with the super-channel. In some implementations, super-channels may be displayed in an order or a sequence, with the first super-channel (e.g., SCH 1)including spectral slices at the beginning of an optical spectrum (e.g., slice 1), and the last super-channel (e.g., SCH 19) including spectral slices at the end of the spectrum (e.g., slice 384, or in the illustrated scenario, slice 380). As illustrated, SDE 615 may display a first super-channel (SCH 1) on top of a stack of super-channels when the first super-channel is associated with spectral slices 1-32.

SDE 615 may display a super-channel using a particular and/or relative size to convey information associated with the super-channel. For example, SDE 615 may display a super-channel using a size that is proportional to the quantity of spectral slices included in the super-channel. The quantity of spectral slices included in a super-channel may depend on a super-channel type. As illustrated, SDE 620 may display a super-channel (SCH 1) of type "1000-xPSK," which includes 32 spectral slices, and SDE 625 may display a super-channel (SCH 4) of type "500-3QAM CS," which includes 20 spectral slices. SCH 1 may be displayed in a more prominent manner (e.g., larger, bolder, in a different color, etc.) than SCH 4 because SCH 1 includes more spectral slices (e.g., has a greater capacity) than SCH 4, as illustrated.

In the figures, every super-channel may not be illustrated as precisely proportional to the quantity of slices that make up the super-channel. However, SDE 615 may display super-channels of the same type using the same size, and may display a super-channel size as proportional to the quantity of slices included in the super-channel.

SDE 615 may display a super-channel using a particular label to convey information associated with the super-channel. A super-channel label may provide an indication of a super-channel identifier (e.g., a number) associated with a super-channel, a super-channel type associated with a super-channel, a capacity of a super-channel, an allocation status associated with a super-channel, an alert status associated with a super-channel, and/or other characteristics associated with a super-channel. For example, SDE 620 may display a super-channel label that provides an indication of a super-channel identifier associated with a super-channel (e.g., "SCH 1"), a bandwidth associated with the super-channel (e.g., "1000" Gbps), a modulation type associated with the super-channel (e.g., "xPSK"), and/or a super-channel type associated with the super-channel (e.g., "1000-xPSK"), as illustrated.

SDE 615 may display a super-channel using a particular color and/or pattern in order to convey information associated with the super-channel. For example, SDE 615 may display a super-channel using a particular color to indicate an allocation status associated with the super-channel. As illustrated, SDE 620 may display an assigned super-channel using a first color, SDE 625 may display a used super-channel using a second color, SDE 630 may display blocked spectral slices using a third color, and SDE 635 may display an available super-channel using a fourth color.

An allocation status may include, for example, assigned, used, blocked, and/or available. In some implementations, an assigned status may indicate that a super-channel has been assigned to transmit optical signals, but is not currently transmitting optical signals. Additionally, or alternatively, an assigned status may indicate that a super-channel is associated with a line module (e.g. an FRM) and/or a cross-connect (e.g., a termination point on an FRM) on one end (e.g., on NE 250-1), but is not associated with a line module and/or a cross-connect on the other end (e.g., on NE 250-2). SDE 620 may display assigned super-channels using a first color (e.g., green or light gray).

In some implementations, a used status may indicate that a super-channel is currently transmitting data. Additionally, or alternatively, a used status may indicate that a super-channel is associated with lines modules (e.g., FRMs) and/or cross-connects (e.g., termination points on FRMs) on both NEs 250 that the super-channel connects (e.g., NE 250-1 and NE 250-2). SDE 625 may display used super-channels using a second color (e.g., dark gray).

In some implementations, a blocked status may indicate that a super-channel and/or one or more spectral slices are unavailable for allocation. For example, a super-channel may be blocked when there is not enough capacity to support allocation of the super-channel and/or spectral slices using a selected super-channel type. As illustrated, SDE 615 may aid in allocating super-channels of type "500-xPSK," which include 20 spectral slices per super-channel. For these super-channel types ("500-xPSK"), 19 super-channels may be allocated along particular slices of an optical spectrum (e.g., slices 1-20 for SCH l, slices 21-40 for SCH 2, slices 41-60 for SCH 3, etc.). As illustrated, SDE 620 may display an assigned super-channel of type "1000-xPSK," which includes 32 slices allocated to slices 1-32. This assignment uses SCH 1 (slices 1-20) and a portion of SCH 2 (slices 21-32 of SCH 2, which includes slices 21-40), leaving slices 33-40 available for allocation. However, super-channels of type "500-xPSK" require 20 slices that may only be allocated on particular sets of slices (e.g., on slices 1-20, 21-40, 41-60, 61-80, etc.). Thus, "500-xPSK" cannot be allocated on slices 33-40, and SDE 630 may display slices 33-40 as blocked (e.g., using a third color, such as black), as illustrated. Additionally, or alternatively, a blocked status may indicate that a super-channel and/or spectral slices have not been configured for allocation between NEs 250.

In some implementations, an available status may indicate that a super-channel is available for data transmission (e.g., the super-channel is not assigned, used, or blocked). Additionally, or alternatively, an available status may indicate that a super-channel is not associated with a line module or cross-connect on either NE 250 that the super-channel connects. As illustrated, SDE 635 may display available super-channels using a fourth color (e.g., white).

Allocation display elements ("ADE" or "ADEs") 640 and 645 may provide a summary of allocation statuses for displayed spectral slices and/or displayed super-channels. ADE 640 may indicate a quantity of displayed spectral slices having a particular allocation status. As illustrated, ADE 640 may display an indication that there are 384 spectral slices on a fiber connecting NE 250-1 to NE 250-2, with 40 used slices, 52 assigned slices, 8 blocked slices, and 284 available slices. ADE 645 may indicate a quantity of displayed super-channels having a particular allocation status. As illustrated, ADE 645 may display an indication that there are 19 super-channels connecting FRM 1-A-5 on NE 250-1 to FRM 1-A-5 on NE 250-2, with 5 allocated (e.g., used, assigned, and/or blocked) super-channels and 14 available super-channels. In some implementations, ADEs 640 and 645 may provide a summary of allocation statuses across a span of multiple NEs 250.

Termination point display element ("TPDE") 650 may provide an indication of super-channel connection termination points (e.g., ports) on an FRM associated with a displayed NE 250. TPDE 650 may provide an indication of allocated termination points. For example, TPDE 650 may display a line connecting allocated termination points to allocated super-channels. In some implementations, the line may be displayed in the same color as the super-channel to which it is connected in order to indicate an allocation status of the termination point. Additionally, or alternatively, termination points that have not been allocated may be displayed without a line connecting the termination point to a super-channel.

Add/drop display element ("ADDE") 655 may provide an indication of transmissions (e.g., via super-channels) that are added and/or dropped by a displayed NE 250. In some implementations, ADDE 655 may display a particular shape to indicate an add/drop location of a transmission. As illustrated, ADDE 655 may display a circle on NE 250-3 to indicate that the transmission associated with "SCH 1: 1000-xPSK" between NE 250-2 and NE 250-3 is added or dropped at NE 250-3. In some implementations, ADDE 655 may use a different indicator for an added transmission than for a dropped transmission.

Express route display element ("ERDE") 660 may provide an indication of a route (e.g., a super-channel) allocated between a component that is displayed on UI 600 (e.g., FRM 1-A-6 on NE 250-2) and a component that is not displayed on UI 600. For example, UI 600 displays FRMs 1-A-5 and 1-A-6 on NE 250-2. There may be other FRMs on NE 250-2 not displayed by UI 600. ERDE 660 may provide an indication that a route has been allocated between FRM 1-A-6 on NE 250-2 (displayed by UI 600) and one of the other FRMs on NE 250-2 that is not displayed by UI 600. In some implementations, ERDE 660 may display a particular shape to provide this indication. As illustrated, ERDE 660 may display a square on NE 250-2 to indicate that the transmission associated with "SCH 1: 1000-xPSK" between NE 250-2 and NE 250-3 is routed between FRM 1-A-6 on NE 250-2 and another FRM (one that is not displayed on UI 600) on NE 250-2 other than FRM 1-A-5 (which is displayed on UI 600).

Local route identifier element ("LRIE") 665 may provide an indication of a route allocated between displayed components (e.g., displayed FRMs on NE 250). For example, LRIE 665 may display a line connecting allocated super-channels. In some implementations, the line may be displayed in the same color as a super-channel and/or super-channels to which it is connected in order to indicate an allocation status of the route. As illustrated, LRIE 665 may display a line on NE 250-2 connecting SCH 14 between NE 250-1 and NE 250-3. The line connects termination points on FRM 1-A-5 and FRM 1-A-6 on NE 250-2 to indicate that the route is allocated between these FRMs (1-A-5 and 1-A-6 on NE 250-2, both of which are displayed).

LRIE 670 may provide an indication of a route available for allocation between displayed components (e.g., displayed FRMs on NE 250). For example, LRIE 670 may display a line connecting available super-channels and/or termination points. In some implementations, the line may be a dashed line. As illustrated, LRIE 670 may display a dashed line on NE 250-2 connecting SCH 19 between NE 250-1 and NE 250-3. The line connects termination points on FRM 1-A-5 and FRM 1-A-6 on NE 250-2 to indicate that a route is available between these FRMs (1-A-5 and 1-A-6 on NE 250-2, both of which are displayed). Additionally, or alternatively, available routes may be displayed without a line connecting available super-channels and/or termination points. In some implementations, LRIE 670 may display a line connecting SDE 615 and TPDE 650 to indicate continuity across one or more spans of optical links (e.g., to indicate that SCH 19 between NE 250-1 and NE 250-2 continues in the route as SCH 19 between NE 250-2 and NE 250-3).

Alert elements 675-690 may provide an indication of alerts (e.g., errors, notifications, alarms, warnings, etc.) associated with a displayed super-channel, a displayed component, and/or a displayed NE 250. Alerts may be associated with a cross-connect problem associated with an NE 250, a service state associated with a super-channel, a configuration problem associated with a super-channel, an optical viability problem associated with a super-channel, and/or any other alert that may convey information (e.g., an issue, problem, alarm, error, etc.) associated with an optical network.

Alert element 675 may provide an indication that a super-channel is not connected to a cross-connect (e.g., is not being added, dropped, or routed by NE 250). Additionally, or alternatively, alert element 675 may indicate that a line module has not been installed. As illustrated, alert element 675 may display a question mark or another notification at a cross-connect location on NE 250-3 to indicate that a transmission associated with SCH 14 is not being routed, added, or dropped by NE 250-3.

Alert element 680 may provide an indication of a service state of a super-channel. A service state may include in-service or out-of-service. As illustrated, alert element 680 may display an "X" or another notification on SCH 14 between NE 250-2 and NE 250-3 to indicate that SCH 14 is out of service between NE 250-2 and NE 250-3. Additionally, or alternatively, alert element 680 may indicate that a super-channel is out of service along a route associated with the super-channel (e.g., SCH 14 between NE 250-1 and NE 250-3, as illustrated).

Alert element 685 may provide an indication of a configuration problem of a super-channel. A configuration problem may indicate that a modulation type configured on a cross-connect at one end of a route does not match a modulation type configured on a cross-connect at the other end of the route. As illustrated, alert element 685 may display an exclamation point or another notification on SCH 14 between NE 250-2 and NE 250-3 to indicate that the cross-connect on NE 250-2 is configured for one super-channel type (e.g., "500-xPSK"), and the cross-connect on NE 250-3 is configured for a different super-channel type (e.g., "1000-xPSK"). In some implementations, SDE 615 may display a super-channel between misconfigured cross-connects (e.g., SCH 14) using a size based on the super-channel type that includes a larger quantity of spectra slices (e.g., displayed using a size based on super-channel type "1000-xPSK" rather than "500-xPSK"). Additionally, or alternatively, alert element 685 may indicate that a super-channel is associated with a configuration problem somewhere along a route associated with the super-channel (e.g., SCH 14 between NE 250-1 and NE 250-3, as illustrated).

Alert element 690 may provide an indication of an optical viability problem of a super-channel. An optical viability problem may indicate that a super-channel cannot transmit light across a route without loss of data integrity due to errors, light degradation, etc. As illustrated, alert element 690 may display a double dagger ("‡") or another notification on SCH 14 between NE 250-2 and NE 250-3 to indicate that SCH 14 is not optically viable for a particular data transmission between NE 250-2 and NE 250-3. Additionally, or alternatively, alert element 690 may indicate that a super-channel is associated with an optical viability problem along a route associated with the super-channel (e.g., SCH 14 between NE 250-1 and NE 250-3, as illustrated).

Selected super-channel type identifier element 695 may identify a user-specified super-channel type. A user may specify a super-channel type in order to allocate capacity to super-channels of the specified super-channel type. Super-channels representations displayed by SDE 615 may change based on the specified super-channel type. As illustrated, selected super-channel type identifier element 695 may indicate that a user has selected a super-channel type "500-xPSK," and SDE 615 may change to allow a user to select available super-channels of type "500-xPSK" for allocation. SDE 615 may change the displayed quantity, position, size, and/or labels associated with the displayed super-channels based on characteristics associated with the user-specified super-channel type.

Figure 7:
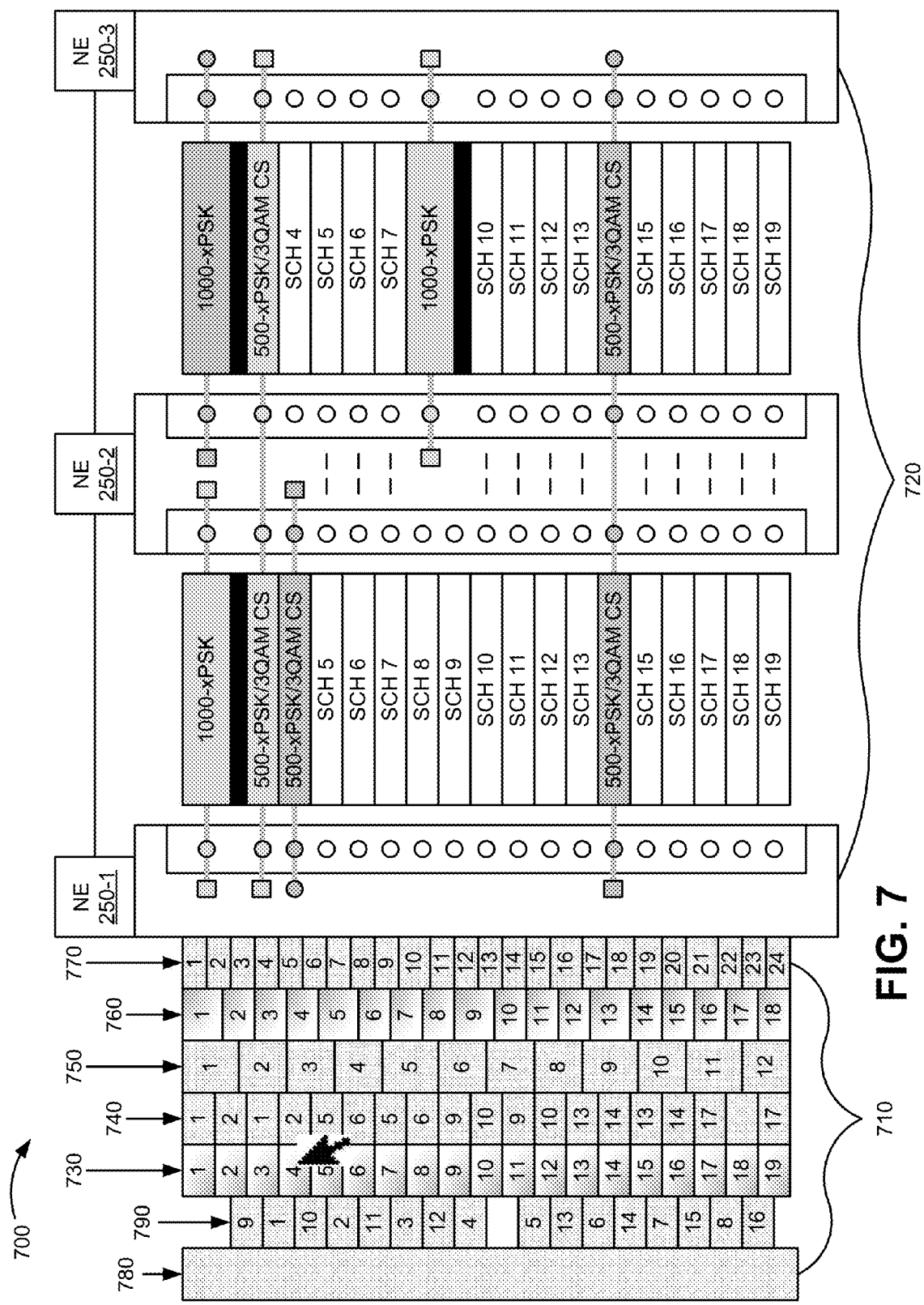
FIG. 7 is a diagram of an example user interface that may aid a user in selecting a super-channel type for allocating optical network capacity.

FIG. 7 is a diagram of an example user interface 700 ("UI 700") that may aid a user in selecting a super-channel for allocating network capacity. In some implementations, UI 700 may be displayed by NA 220 and/or user device 230. As illustrated, UI 700 may include a selection element 710, a display element 720, and super-channel type selector elements ("STSE" or "STSEs") 730-790. Additionally, or alternatively, UI 700 may include fewer elements, additional elements, different elements, or differently arranged elements than those illustrated in FIG. 7, such as elements 605-695 of UI 600.

Selection element 710 may provide a mechanism (e.g., a button, an icon, a link, a drop-down menu, a text box, etc.) for a user to select a super-channel type for capacity allocation. In some implementations, selection element 710 may display information associated with super-channel types that may be selected by a user in order to assist in allocating network capacity. The super-channel types displayed by selection element 710 may be based on super-channel types configured for allocation between displayed NEs 250 and/or configured for allocation over a user-selected route.

As illustrated, STSE 730 may correspond to super-channel type "500-xPSK/3QAM CS," STSE 740 may correspond to super-channel type "500-xPSK/3QAM SS," STSE 750 may correspond to super-channel type "1000-xPSK," STSE 760 may correspond to super-channel type "1000-8QAM," STSE 770 may correspond to super-channel type "1000-16QAM," STSE 780 may correspond to a custom channel plan, and STSE 790 may correspond to super-channel type "OCG."

Display element 720 may include elements 605-695, described herein in connection with FIG. 6. Display element 720 may display particular elements and/or may display elements in a particular manner based on a user selection of a super-channel type (e.g., via selection element 710). For example, a quantity, location, label, and/or size of one or more super-channels displayed by display element 720 may change based on a super-channel type selected by a user. In some implementations, a user may select a super-channel type using a mouse click (e.g., a mouse click on one of STSEs 730-790 within selection element 710). Additionally, or alternatively, a user may select a super-channel type using a drop down box, a combo box, a list box, a text box, etc.

Figure 8:
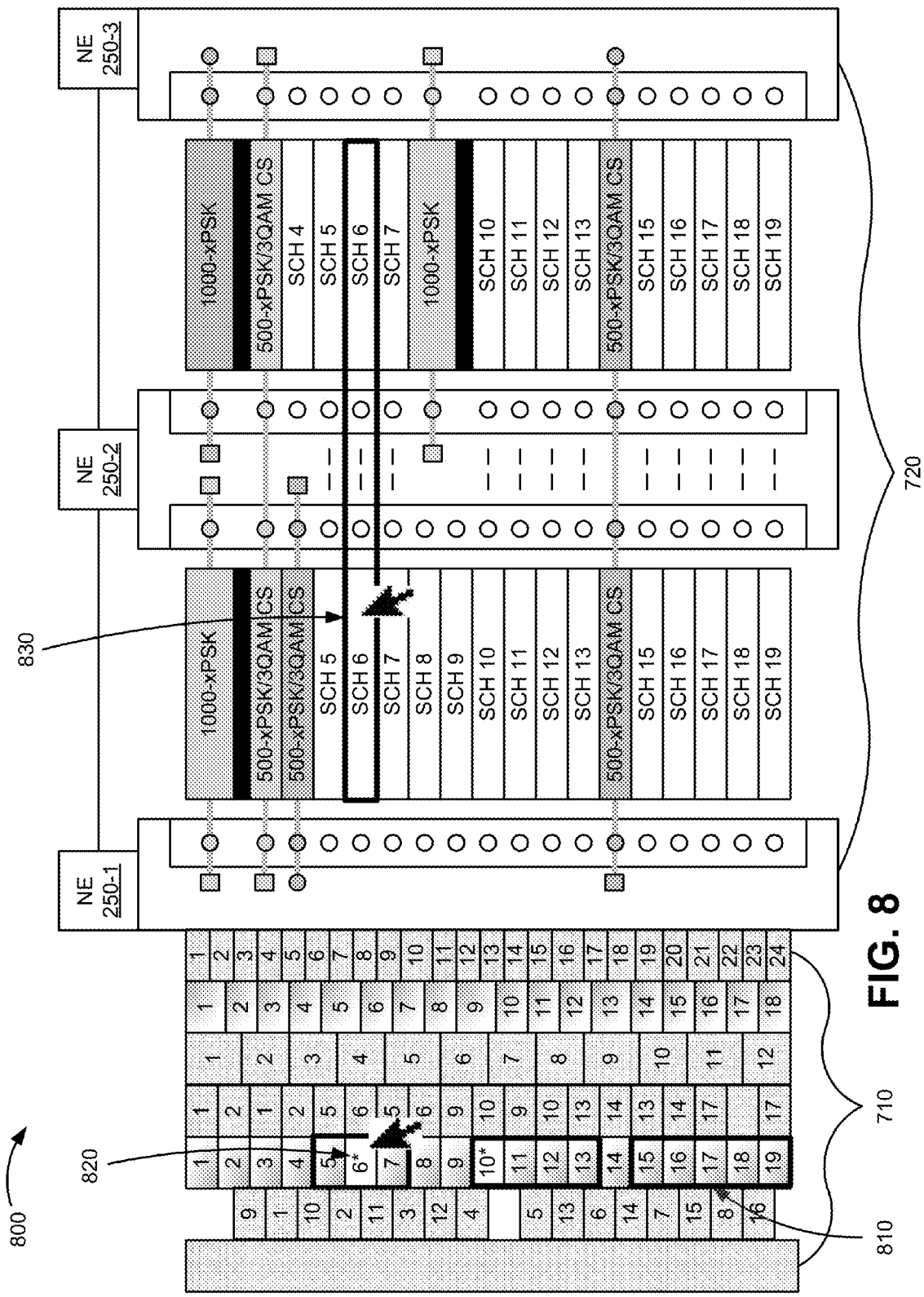
FIG. 8 is a diagram of an example user interface that may aid a user in selecting a super-channel for allocating optical network capacity.

FIG. 8 is a diagram of an example user interface 800 ("UI 800") that may aid a user in selecting a super-channel for allocating optical network capacity. In some implementations, UI 800 may be displayed by NA 220 and/or user device 230. As illustrated, UI 800 may include selection element 710 and display element 720, as described herein in connection with FIG. 7. Additionally, or alternatively, UI 800 may include availability indicator 810, optical viability indicator 820, and selected super-channel indicator 830. Additionally, or alternatively, UI 800 may include fewer elements, additional elements, different elements, or differently arranged elements than those illustrated in FIG. 8, such as elements 605-695 of UI 600 and elements 730-790 of FIG. 7.

Elements displayed by UI 800, selection element 710, display element 720, availability indicator 810, optical viability indicator 820, and selected super-channel indicator 830 may be based on a user selection of STSE 730, which corresponds to super-channel type "500-xPSK/3QAM CS." For example, a user may click on STSE 730 within selection element 710, as illustrated by a mouse cursor within selection element 710. Display element 720 may provide information associated with available super-channels, assigned super-channels, used super-channels, and/or blocked super-channels and/or spectral slices based on the user selection. For example, display element 720 may display available super-channels (e.g., displayed in white) and blocked slices (e.g., displayed in black) based on user selection of STSE 730 (which is associated with 19 super-channels), as illustrated. In some implementations, used super-channels and assigned super-channels may not change based on the user selection.

Availability indicator 810 may identify super-channels of the selected type that are available for allocation across a desired optical route (here, from NE 250-1 to NE 250-2 to NE 250-3). An optical route may include one or more super-channels that connect two or more NEs 250. As illustrated, availability indicator 810 may indicate that super-channels 5-7, 10-13, and 15-19 are available across the entirety of the desired route. Availability indictor 810 may use highlighting, outlining, labels, colors, and/or patterns to indicate super-channels that are available for allocation across the desired route. For example, availability indicator 810 may outline super-channels in selection element 710 that are available across the desired route, as illustrated. Additionally, or alternatively, availability indicator 810 may indicate super-channels that are available for allocation across a desired route in display element 720.

Optical viability indicator 820 may identify super-channels that are optically viable across the entirety of the desired route. Optical viability may refer to the ability of a super-channel to deliver light across the desired route without loss of data integrity due to errors, light degradation, etc. Optical viability indicator 820 may use highlighting, outlining, labels, colors, and/or patterns to indicate super-channels that are optically viable for transporting data across the desired route. For example, optical viability indicator 820 may indicate that super-channels 6 and 10 are optically viable by labeling super-channels 6 and 10 with an asterisk (*) in selection element 710, as illustrated. In some implementations, a check mark and/or other indicator may be used. Additionally, or alternatively, optical viability indicator 820 may indicate optically viable super-channels in display element 720.

Selected super-channel indicator 830 may identify user selection of a particular super-channel for allocating a data transmission. In some implementations, a user may select a particular super-channel by clicking on the super-channel within display element 720, as illustrated by a mouse cursor within display element 720. Additionally, or alternatively, a user may select a particular super-channel by clicking on the super-channel in selection element 710 (e.g., a second click after an initial click to select the super-channel type). Additionally, or alternatively, a user may select a particular super-channel for allocating a data transmission using a drop down box, a combo box, a list box, a text box, etc.

Selected super-channel indicator 830 may use highlighting, outlining, labels, colors, and/or patterns to indicate the super-channel that has been selected by a user. For example, selected super-channel indicator 830 may identify a user-selected super-channel (e.g., super-channel 6) by highlighting the super-channel in display element 720, as illustrated. Additionally, or alternatively, selected super-channel indicator 830 may indicate a user-selected super-channel in selection element 710.

Figure 9:
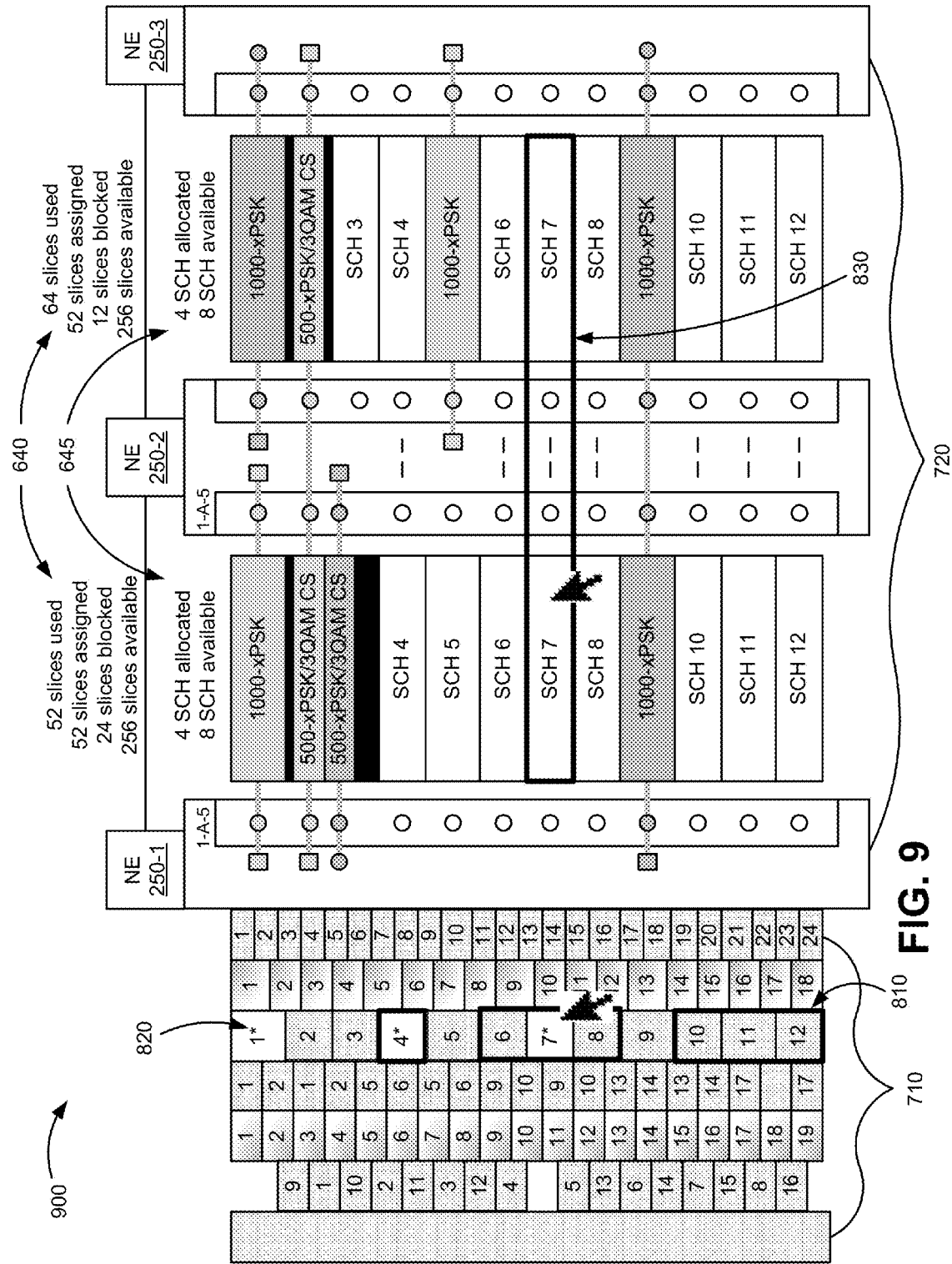
FIG. 9 is a diagram of another example user interface that may aid a user in selecting a super-channel for allocating optical network capacity.

FIG. 9 is a diagram of another example user interface 900 ("UI 900") that may aid a user in selecting a super-channel for allocating optical network capacity. In some implementations, UI 900 may be displayed by NA 220 and/or user device 230. As illustrated, UI 900 may include allocation display elements 640 and 645, as described herein in connection with FIG. 6. Additionally, or alternatively, UI 900 may include selection element 710, display element 720, availability indicator 810, optical viability indicator 820, and selected super-channel indicator 830, as described herein in connection with FIGS. 7 and 8. Additionally, or alternatively, UI 900 may include fewer elements, additional elements, different elements, or differently arranged elements than those illustrated in FIG. 9, such as elements 605-695 of UI 600 and elements 730-790 of FIG. 7.

Elements displayed by UI 900, ADEs 640 and 645, selection element 710, display element 720, availability indicator 810, optical viability indicator 820, and selected super-channel indicator 830 may be based on a user selection of STSE 750, which corresponds to super-channel type "1000-xPSK." For example, a user may click on STSE 750 within selection element 710, as illustrated by a mouse cursor within selection element 710. Display element 720 may display available super-channels (e.g., displayed in white) and blocked slices (e.g., displayed in black) based on user selection of STSE 750 (which is associated with 12 super-channels), as illustrated.

ADEs 640 and 645 may provide a summary of allocation statuses for displayed spectral slices and/or displayed super-channels. As illustrated, ADE 640 may display an indication that there are 384 spectral slices on a fiber connecting NE 250-1 to NE 250-2, with 52 used slices, 52 assigned slices, 24 blocked slices, and 256 available slices. As illustrated, ADE 645 may display an indication that there are 12 super-channels connecting FRM 1-A-5 on NE 250-1 to FRM 1-A-5 on NE 250-2, with 4 allocated (e.g., used, assigned, and/or blocked) super-channels and 8 available super-channels.

Availability indicator 810 may identify super-channels of the selected type that are available for allocation across a desired route (here, from NE 250-1 to NE 250-2 to NE 250-3). As illustrated, availability indicator 810 may highlight super-channels 4, 6-8, and 10-12 in selection element 710 to indicate that those super-channels are available across the entirety of the desired route. Optical viability indicator 820 may indicate that super-channels 1, 4, and 7 are optically viable by labeling super-channels 1, 4, and 7 with an asterisk (*) in selection element 710, as illustrated.

Selected super-channel indicator 830 may identify a user-selected super-channel (e.g., super-channel 7) by highlighting the selected super-channel in display element 720, as illustrated. In some implementations, a user may select a particular super-channel by clicking on the super-channel within display element 720, as illustrated by a mouse cursor within display element 720. Additionally, or alternatively, a user may select a particular super-channel by clicking on the super-channel in selection element 710 (e.g., a second click after an initial click to select the super-channel type).

Additionally, or alternatively, a user may select a particular super-channel for allocating a data transmission using a drop down box, a combo box, a list box, a text box, etc.

Figure 10:
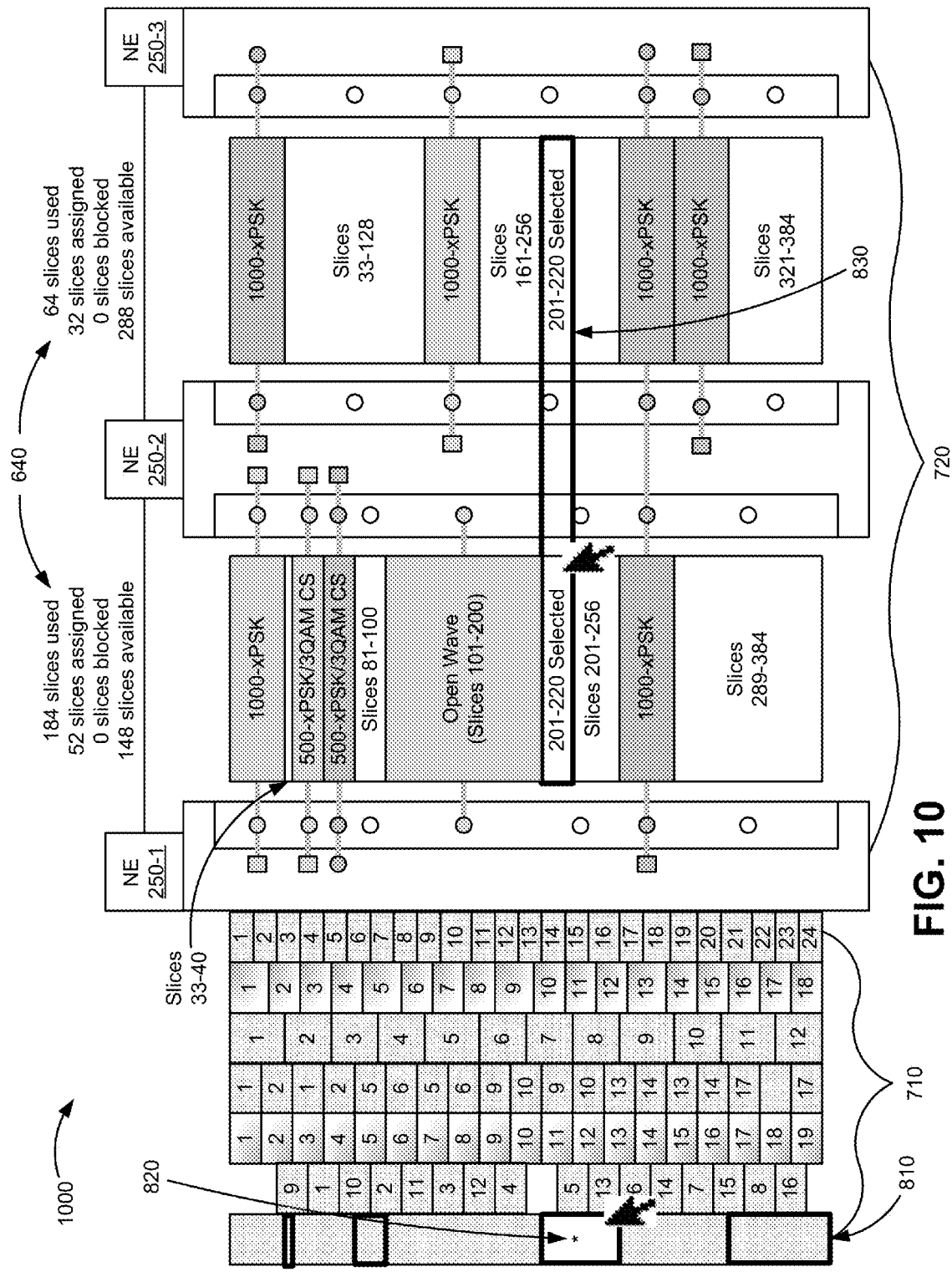
FIG. 10 is a diagram of an example user interface that may aid a user in selecting spectral slices for allocating optical network capacity.

FIG. 10 is a diagram of an example user interface 1000 ("UI 1000") that may aid a user in selecting spectral slices for allocating optical network capacity. In some implementations, UI 1000 may be displayed by NA 220 and/or user device 230. As illustrated, UI 1000 may include allocation display element 640, as described herein in connection with FIG. 6. Additionally, or alternatively, UI 1000 may include selection element 710, display element 720, availability indicator 810, optical viability indicator 820, and selected super-channel indicator 830, as described herein in connection with FIGS. 7 and 8. Additionally, or alternatively, UI 1000 may include fewer elements, additional elements, different elements, or differently arranged elements than those illustrated in FIG. 10, such as elements 605-695 of UI 600 and elements 730-790 of FIG. 7.

Elements displayed by UI 1000, ADE 640, selection element 710, display element 720, availability indicator 810, optical viability indicator 820, and selected super-channel indicator 830 may be based on a user selection of STSE 780, which corresponds to a custom channel plan. For example, a user may click on STSE 780 within selection element 710, as illustrated by a mouse cursor within selection element 710. A custom channel plan may allow a user to select specific spectral slices for allocation, rather than selecting a super-channel.

Display element 720 may display available spectral slices (e.g., displayed in white) based on user selection of STSE 780, and may display an indication of the slice numbers associated with the available slices (e.g., slices 33-40, 81-100, 201-256, and 321-384 between NE 250-1 and NE 250-2). In some implementations, a user may be required to select a minimum quantity of contiguous slices for allocation (e.g., four contiguous slices), and display element 720 may provide an indication of blocked spectral slices (e.g., where there are less than four contiguous slices).

ADEs 640 may provide a summary of allocation statuses for displayed spectral slices. As illustrated, ADE 640 may display an indication that there are 384 spectral slices on a fiber connecting NE 250-1 to NE 250-2, with 184 used slices, 52 assigned slices, 0 blocked slices, and 148 available slices.

Availability indicator 810 may identify spectral slices that are available for allocation across a desired route (here, from NE 250-1 to NE 250-2 to NE 250-3). As illustrated, availability indicator 810 may highlight slices 33-40, 81-100, 201-256, and 321-384 on selection element 710 to indicate that those slices are available across the entirety of the desired route. Optical viability indicator 820 may indicate that slices 201-256 are optically viable by labeling slices 201-256 with an asterisk (*) in selection element 710, as illustrated.

Selected super-channel indicator 830 may indicate user-selected slices (e.g., slices 201-220) by highlighting the selected slices in display element 720, as illustrated. In some implementations, a user may select particular slices by clicking and dragging on available slices within display element 720, as illustrated by a mouse cursor within display element 720. Additionally, or alternatively, a user may select a particular super-channel by clicking and dragging on available slices in selection element 710 (e.g., a click and drag after an initial click to select the super-channel type). In some implementations, a user may click on available slices, and UI 1000 may provide a pop-up box displaying an indication of the first slice and the last slice of the selected available slices. UI 1000 may allow a user to adjust the first and last slices (e.g., using a text box, a slider, a counter, etc.) in order to select a set of slices for bandwidth allocation. Additionally, or alternatively, a user may select a particular super-channel for allocating a data transmission using a drop down box, a combo box, a list box, a text box, etc.

Figure 11:
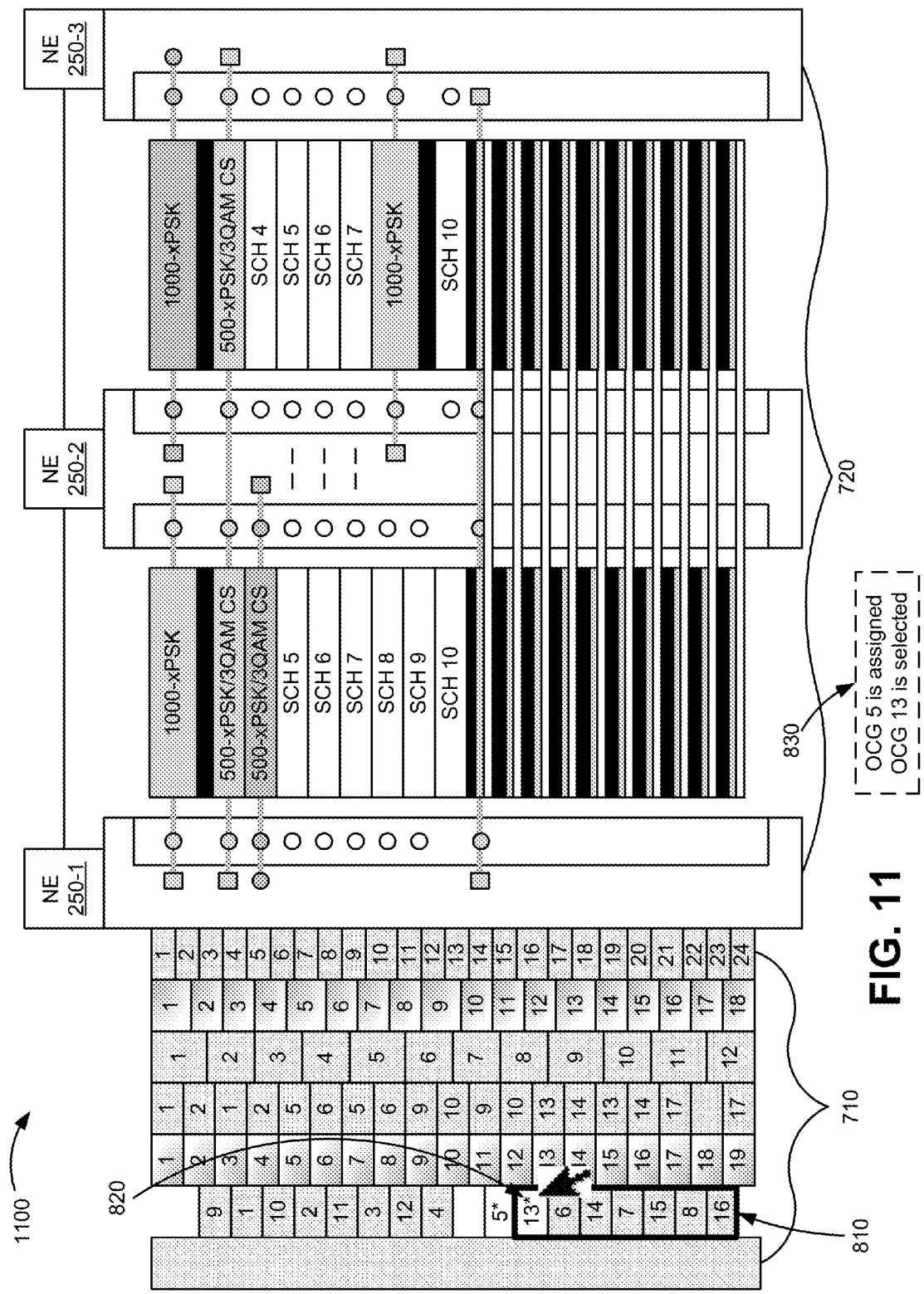
FIG. 11 is a diagram of an example user interface that may aid a user in selecting an Optical Carrier Group for allocating optical network capacity.

FIG. 11 is a diagram of an example user interface 1100 ("UI 1100") that may aid a user in selecting a super-channel for allocating optical network capacity. In some implementations, UI 1100 may be displayed by NA 220 and/or user device 230. As illustrated, UI 1100 may include selection element 710, display element 720, availability indicator 810, optical viability indicator 820, and selected super-channel indicator 830, as described herein in connection with FIGS. 7 and 8. Additionally, or alternatively, UI 1100 may include fewer elements, additional elements, different elements, or differently arranged elements than those illustrated in FIG. 11, such as elements 605-695 of UI 600 and elements 730-790 of FIG. 7.

Elements displayed by UI 1100, selection element 710, display element 720, availability indicator 810, optical viability indicator 820, and selected super-channel indicator 830 may be based on a user selection of STSE 790, which corresponds to super-channel type "OCG." For example, a user may click on STSE 790 within selection element 710, as illustrated by a mouse cursor within selection element 710. OCG super-channel type may allow a user to allocate ten non-contiguous sets of slices, as illustrated in display element 720 (e.g., ten non-contiguous slices between SCH 9 and SCH 19).

Display element 720 may display an indication of used OCG super-channels, assigned OCG super-channels (e.g., OCG super-channel 5, as illustrated), available OCG super-channels, and/or blocked OCG super-channels based on user selection of STSE 790. In some implementations, spectral slices may be available for allocation to super-channel type "OCG," and unavailable (e.g., blocked) for allocation to other super-channel types (e.g., "1000-xPSK," "500 3QAM CS," etc.). Display element 720 may display OCG super-channel allocation statuses (e.g., available or blocked) based on user selection of a super-channel type.

Availability indicator 810 may identify OCG super-channels that are available for allocation across a desired route (here, from NE 250-1 to NE 250-2 to NE 250-3). As illustrated, availability indicator 810 may highlight OCG super-channels 6-8 and 13-16 on selection element 710 to indicate that those OCG super-channels are available across the entirety of the desired route. Optical viability indicator 820 may indicate that OCG super-channels 5 and 13 are optically viable by labeling OCG super-channels 5 and 13 with an asterisk (*) in selection element 710, as illustrated.

Selected super-channel indicator 830 may indicate user-selected slices (in this example, OCG super-channel 13) by highlighting the selected slices in display element 720 and/or providing a separate indication of the selected OCG super-channel, as illustrated. In some implementations, a user may select a particular OCG super-channel by clicking on the OCG super-channel within selection element 710 (e.g., a second click after an initial click to select the super-channel type). Additionally, or alternatively, a user may select a particular OCG super-channel for allocating a data transmission using a drop down box, a combo box, a list box, a text box, etc.

Figure 12:
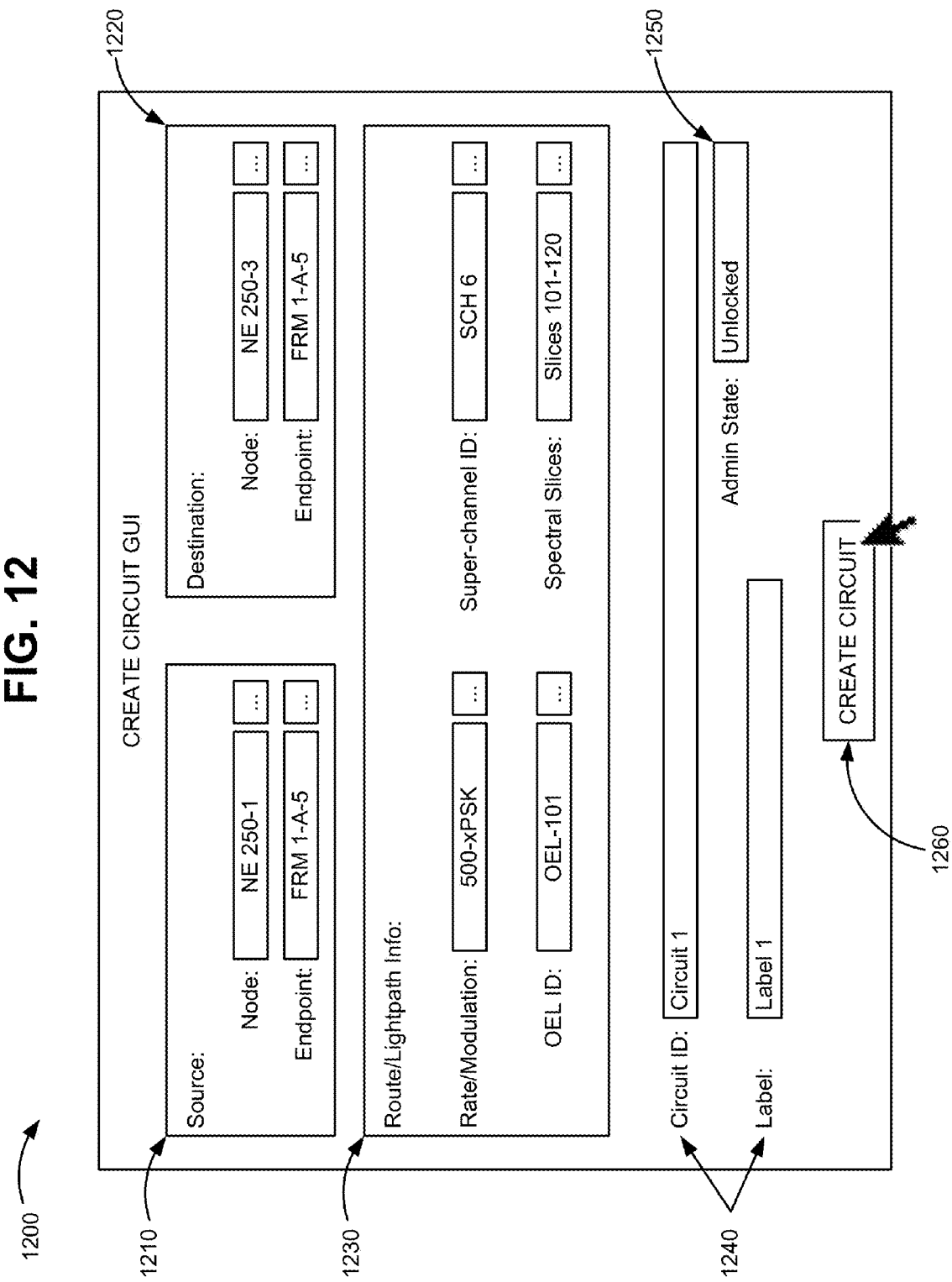
FIG. 12 is a diagram of an example user interface that may aid a user in allocating optical network capacity.

FIG. 12 is a diagram of an example user interface 1200 ("UI 1200") that may aid a user in allocating optical network capacity. In some implementations, UI 1200 may be displayed by NA 220 and/or user device 230. As illustrated, UI 1200 may include a source identifier element 1210, a destination identifier element 1220, a route information element 1230, a route identifier element 1240, an administrator element 1250, and a circuit creation element 1260. Additionally, or alternatively, UI 1200 may include fewer elements, additional elements, different elements, or differently arranged elements than those illustrated in FIG. 12.

Source identifier element 1210 may provide a mechanism (e.g., a button, an icon, a text box, a link, etc.) for a user to select a source for an optical data transmission. For example, source identifier element 1210 may identify an NE 250 and/or a component of NE 250 (e.g., an FRM) as a source for a data transmission that is to be transmitted over a super-channel. In some implementations, source identifier element 1210 may be populated based on user selection of one or more elements of UIs 600-1100. For example, a user may select NE 250-1 on node display element 605 and/or may select FRM 1-A-5 on component display element 610 to populate source identifier element 1210 with a node identifier and/or an endpoint identifier, as illustrated.

Destination identifier element 1220 may provide a mechanism (e.g., a button, an icon, a text box, a link, etc.) for a user to select a destination for an optical data. For example, destination identifier element 1220 may identify an NE 250 and/or a component of NE 250 (e.g., an FRM) as a destination for a data transmission that is to be transmitted over a super-channel. In some implementations, destination identifier element 1220 may be populated based on user selection of one or more elements of UIs 600-1100. For example, a user may select NE 250-3 on node display element 605 and/or may select FRM 1-A-5 on component display element 610 to populate destination identifier element 1220 with a node identifier and/or an endpoint identifier, as illustrated.

Route information element 1230 may provide a mechanism (e.g., a button, an icon, a text box, a link, etc.) for a user to select route information for an optical transmission to be allocated. For example, a user may select a rate of a super-channel to be allocated, a modulation format of a super-channel to be allocated, a super-channel type of a super-channel to be allocated, a super-channel identifier of a super-channel to be allocated, a spectral slice identifier of one or more spectral slices to be allocated, an optically engineered lightpath (e.g., an "OEL," which may be a particular route over NEs 250 and components of NEs 250 using particular super-channels) associated with a data transmission to be allocated, etc. In some implementations, route information element 1230 may be populated based on user selection of one or more elements of UIs 600-1100. For example, a user may select a super-channel rate, modulation format, and/or type (e.g., "500-xPSK"), a super-channel identifier (e.g., "SCH 6"), one or more spectral slices (e.g., "slices 101-120"), and/or an OEL (e.g., "OEL-101") on an element of UIs 600-1100 (e.g., elements 615-635) to populate route information element 1230.

In some implementations, elements 1210-1230 may be populated by user selection of an available super-channel displayed by SDE 615. Selection of an available super-channel may provide elements 1210-1230 with information associated with a source and/or destination node and/or endpoint associated with the selected super-channel; a bandwidth, modulation format, and/or super-channel type associated with the selected super-channel; a super-channel identifier associated with the selected super-channel; and/or any other information associated with the selected super-channel (e.g., information that may be used to allocate the selected super-channel).

Additionally, or alternatively, elements 1210-1230 may be populated by user selection of an available cross-connect (e.g., termination point) displayed by TPDE 650. Selection of an available cross-connect may provide elements 1210-1230 with information associated with a node and/or endpoint (e.g., a source node and/or endpoint) associated with the selected cross-connect; a bandwidth, modulation format, and/or super-channel type associated with the selected cross-connect; a super-channel associated with the selected cross-connect; a super-channel identifier associated with the selected cross-connect; a second cross-connect associated with the selected cross-connect; a node and/or endpoint associated with the second cross-connect (e.g., a destination node and/or endpoint); and/or any other information associated with the selected cross-connect (e.g., information that may be used to allocate the selected cross-connect and/or a super-channel associated with the selected cross-connect).

Route identifier element 1240 may provide a mechanism (e.g., a button, an icon, a text box, a link, etc.) for a user to input information that identifies the route and/or optical lightpath specified by elements 1210-1230. For example, a user may input a circuit identifier and/or a label for the route to be allocated.

Administrator element 1250 may provide a mechanism (e.g., a button, an icon, a text box, a link, etc.) for a user to change an administrative state of a particular route and/or NEs 250 associated with a particular route. An administrative state may include locked or unlocked. A locked administrative state may take NE 250 out of service, and may allow a user to change a configuration and/or a parameter associated with NE 250. An unlocked administrative state may prevent a user from changing one or more parameters and/or configurations associated with NE 250. In some implementations, NE 250 may be in-service only when unlocked. Additionally, or alternatively, administrator element 1250 may provide a mechanism for a user to lock (e.g., by using a password) a route and/or NEs 250 associated with a route so that information associated with the route cannot be deleted and/or edited by other users.

Circuit creation element 1260 may provide a mechanism (e.g., a button, an icon, a link, etc.) for a user to allocate a route based on information input using elements 1210-1250. Allocating a route using circuit creation element 1260 may cause network configurer 430 to provide information input using elements 1210-1250 to NEs 250 for capacity allocation based on the input information. Once a route has been allocated, UIs 600-1100 may be updated based on the allocated route.

Figure 13:
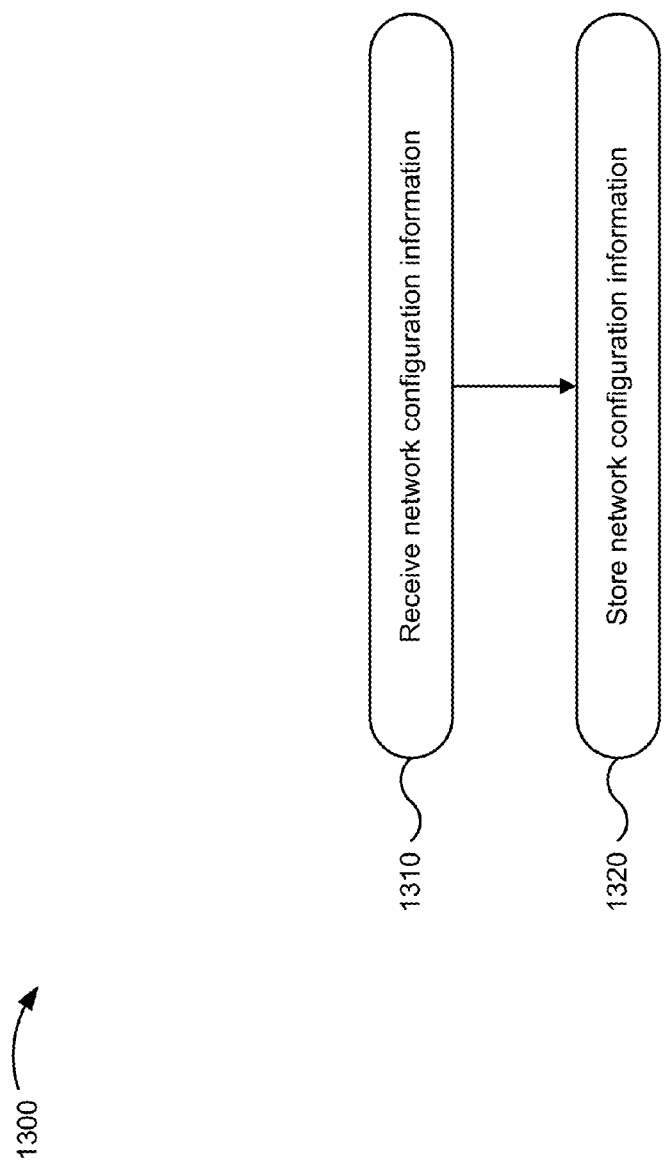
FIG. 13 is a diagram of an example process for receiving and storing network configuration information.

FIG. 13 is a diagram of an example process 1300 for receiving and storing network configuration information. In some implementations, one or more process blocks of FIG. 13 may be performed by one or more components of NA 220 and/or user device 230.

Process 1300 may include receiving network configuration information (block 1310). For example, NCM 410 may receive the network configuration information from NPS 210 and/or NEs 250. NCM 410 may request the network configuration information on a periodic basis (e.g., every second, every minute, every hour, every day, every week, etc.). Additionally, or alternatively, NCM 410 may request the network configuration information in response to a user request for a GUI that displays the network configuration information. Additionally, or alternatively, NPS 210 and/or NEs 250 may automatically provide the network configuration information to NCM 410 (e.g., on a periodic basis and/or when a configuration is changed).

Process 1300 may include storing network configuration information (block 1320). For example, NCM 410 may store the network configuration information in a memory associated with NA 220 and/or user device 230. For example, NCM 410 may store information associated with NEs 250, components of NEs 250 (e.g., FRMs), optical links (e.g., super-channels and associated super-channel types) between NEs 250 and/or FRMs, allocation statuses of optical links, alert information associated with NEs 250, FRMs, and/or super-channels, etc.

Figure 14:
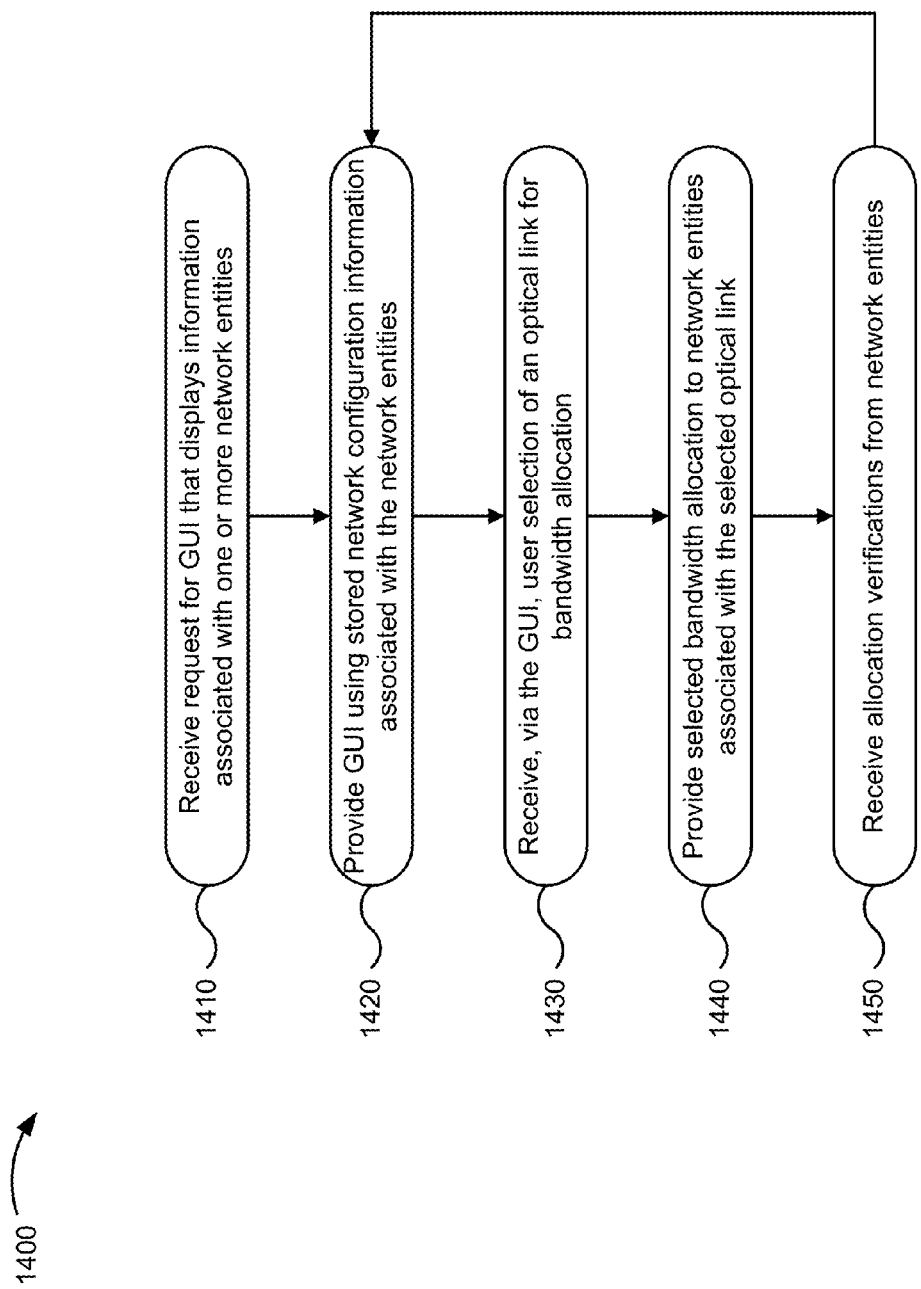
FIG. 14 is a diagram of an example process for allocating bandwidth on network entities via a user interface.

FIG. 14 is a diagram of an example process 1400 for allocating bandwidth on network entities via a user interface. In some implementations, one or more process blocks of FIG. 14 may be performed by one or more components of NA 220 and/or user device 230.

Process 1400 may include receiving a request for a GUI that displays information associated with one or more network entities (block 1410). For example, GUI manager 420 may receive a request from user device 230 for a GUI. The request may be generated based on a user selection of information that identifies one or more NEs 250 and/or one or more routes between NEs 250. In some implementations, GUI manager 420 may authenticate the user (e.g., using a user name and/or a password) prior to providing the requested GUI. The authentication may dictate whether the requested GUI is provided and/or the information that is provided in the requested GUI. For example, based on the authentication of a particular user, a GUI may be formed that includes only particular nodes, only particular types of nodes, only particular super-channels, only particular types of super-channels, etc. Thus, the information provided on the GUI may be based on the authentication of the user.

Process 1400 may include providing a GUI using stored network configuration information associated with the network entities (block 1420). For example, GUI manager 420 may provide a GUI to user device 230 based on network configuration information stored by NCM 410. The GUI may display a representation of one or more NEs 250 based on a user selection of information that identifies the NEs 250. The GUI may display optical links between the NEs 250, an allocation status of the optical links, and/or other information described in connection with UIs 600-1200. When information and/or a configuration associated with NEs 250 changes, the GUI may be updated to display real-time information associated with NEs 250.

Process 1400 may include receiving, via the GUI, a user selection of an optical link for bandwidth allocation (block 1430). For example, the user may select an available optical link (e.g., a super-channel), and the user may indicate a desire to allocate bandwidth on the selected optical link. In some implementations, the user may select an optical link type (e.g., a super-channel type) to aid in selecting an available optical link for bandwidth allocation. GUI manager 420 and/or network configurer 430 may receive the user selection of the optical link.

Process 1400 may include providing the selected bandwidth allocation to network entities associated with the selected optical link (block 1440). In some implementations, network configurer 430 may provide the allocation information to NEs 250 associated with the user-selected optical link. Network configurer 430 may instruct the NEs 250 to allocate bandwidth according to a user selection.

Process 1400 may include receiving allocation verifications from the network entities (block 1450). For example, NEs 250 may provide, to network configuration manager 410, information verifying that NEs 250 have allocated bandwidth based on the user selection. In some implementations, process 1400 may return to block 1420. For example, network configuration manager 410 may provide GUI manager 420 with the verification information. GUI manager 420 may update the GUI displayed on user device 430 based on the verification information. For example, GUI manager 420 may update the GUI to display an updated allocation status of the optical links between NEs 250 based on the user selection of the optical links for bandwidth allocation.

Implementations described herein may assist a user in allocating optical network capacity. This may be achieved by providing information associated with an optical network configuration on a user device and receiving changes to the network configuration (e.g., allocation of capacity) from a user interacting with the user device (e.g., via a user interface).

The foregoing disclosure provides illustration and description, but is not intended to be exhaustive or to limit the embodiments to the precise form disclosed. Modifications and variations are possible in light of the above disclosure or may be acquired from practice of the embodiments.

Certain implementations are described herein with reference to super-channels. However, implementations described herein may be applied to any optical links between network nodes, such as channels, super-channel, spectral slices, fibers, and/or any other optical data transmission link.

While series of blocks have been described with regard to FIGS. 13 and 14, the order of the blocks may be modified in some implementations. Further, non-dependent blocks may be performed in parallel.

Certain user interfaces have been described with regard to FIGS. 6-12. In some implementations, the user interfaces may be customizable by a device. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

As used herein, the term "component" is intended to be broadly construed as hardware, firmware, or a combination of hardware and software.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A non-transitory computer-readable medium, comprising:
one or more instructions that, when executed by one or more processors, cause the one or more processors to:
receive user input that identifies a plurality of network entities in an optical network;
provide, based on the received user input, a user interface that displays:
information that identifies the plurality of network entities,
information that identifies two or more optical link types that have been configured to transmit optical signals among the plurality of network entities,
information that identifies a plurality of optical links associated with the plurality of network entities, and
an indication of an allocation status of the plurality of optical links;
receive a first user selection that identifies an optical link type, of the two or more optical link types;
update, based on the first user selection, the user interface to display information that identifies one or more optical links of the selected optical link type, the one or more optical links connecting at least two of the plurality of network entities;
receive a second user selection that identifies an available optical link; and
provide, based on the second user selection, to two or more network entities associated with the available optical link, information that identifies the available optical link, to permit the available optical link to be allocated for data transmission between the two or more network entities,
where the information that identifies the plurality of optical links includes:
a first identifier that identifies a first superchannel transmitted on one of the plurality of optical links,
a second identifier that identifies a second superchannel transmitted on said one of the plurality of optical links, the first superchannel including a first plurality of optical carriers and the second superchannel including a second plurality of optical carriers, a first optical frequency band being a first range of frequencies occupied by the first plurality of optical carriers and a second optical frequency band being a second range of frequencies occupied by the second plurality of optical carriers, the first and second superchannels being provisioned in the optical network as first and second optical channels, respectively,
a third identifier that identifies a modulation format of each of the first plurality of optical carriers, and
a fourth identifier that identifies a modulation format of each of the second plurality of optical carriers, the first modulation format being different than the second modulation format, and the third identifier being different than the fourth identifier.

2. The computer-readable medium of claim 1, further comprising:
one or more instructions that, when executed by the one or more processors, cause the one or more processors to:
provide, for display on the user interface, an indication of an available optical route that includes a plurality of optical links connecting at least three network entities, of the plurality of network entities.

3. The computer-readable medium of claim 1, further comprising:
one or more instructions that, when executed by the one or more processors, cause the one or more processors to:
receive user input that identifies an optical route; and
provide, for display on the user interface, an indication of one or more optical links, of the plurality of optical links, that are optically viable on the optical route.

4. The computer-readable medium of claim 1, where the allocation status is one of assigned, used, available, or blocked.

5. A system, comprising:
one or more processors to:
receive first user input that identifies a plurality of network entities in an optical network;
provide, based on the first user input, a user interface that displays:
a representation of the plurality of network entities, and
a representation of a plurality of optical link types that have been configured to carry optical signals among the plurality of network entities;
receive second user input that identifies a particular optical link type of the plurality of optical link types;
provide, based on the second user input and for display on the user interface:
a representation of a plurality of optical links of the particular optical link type, the plurality of optical links being associated with the plurality of network entities, and
an indication of an allocation status of the plurality of optical links;
receive, based on the indication of allocation status, third user input that identifies an available optical link, of the plurality of optical links, to be allocated for an optical transmission;
provide, based on the third user input and to two or more network entities of the plurality of network entities, information that identifies the available optical link to permit the available optical link to be allocated for the optical transmission between the two or more network entities,
receive a first identifier that identifies a first superchannel transmitted on one of the plurality of optical links and a second identifier that identifies a second superchannel transmitted on said one of the plurality of optical links, the first superchannel including a first plurality of optical carriers and the second superchannel including a second plurality of optical carriers, a first optical frequency band being a first range of frequencies occupied by the first plurality of optical carriers and a second optical frequency band being a second range of frequencies occupied by the second plurality of optical carriers, the first and second superchannels being provisioned in the optical network as first and second optical channels, respectively;
provide, for display on the user interface, a third identifier that identifies a modulation format of each of the first plurality of optical carriers, and
provide, for display on the user interface, a fourth identifier that identifies a modulation format of each of the second plurality of optical carriers, the first modulation format being different than the second modulation format, and the third identifier being different than the fourth identifier; and provide, for display on the user interface, a representation of the plurality of optical links.

6. The system of claim 5, where each optical link type, of the plurality of optical link types, is associated with a different combination of bandwidth and modulation format.

7. The system of claim 5, where the one or more processors are further to:

provide, for display on the user interface, an indication of an available optical route that includes a plurality of optical links connecting at least three network entities, of the plurality of network entities.

8. The system of claim 5, where the one or more processors are further to:

receive information that identifies an optical route associated with the optical transmission; and provide, for display on the user interface, an indication of one or more optical links that are optically viable on the optical route.

9. The system of claim 5, where the allocation status is at least one of assigned, used, available, or blocked.

* * * * *